(12) United States Patent
Buzek et al.

(10) Patent No.: US 7,199,971 B1
(45) Date of Patent: Apr. 3, 2007

(54) BALANCING A ROTATABLE BODY IN MULTIPLE PLANES USING INVERTIBLE BALANCING PLUGS

(75) Inventors: Mark A. Buzek, Boulder, CO (US); Gale D. Johnson, Loveland, CO (US); David O. Whitt, III, Thornton, CO (US)

(73) Assignee: Maxtor Corporation, Scotts Valley, CA (US)

( * ) Notice: Subject to any disclaimer, the term of this patent is extended or adjusted under 35 U.S.C. 154(b) by 0 days.

(21) Appl. No.: 11/457,257

(22) Filed: Jul. 13, 2006

Related U.S. Application Data

(62) Division of application No. 10/723,691, filed on Nov. 25, 2003, now Pat. No. 7,102,850.

(60) Provisional application No. 60/452,618, filed on Mar. 6, 2003.

(51) Int. Cl.
*G11B 17/02* (2006.01)

(52) U.S. Cl. .................. 360/99.08; 73/458; 74/572.4

(58) Field of Classification Search .................. None
See application file for complete search history.

(56) References Cited

U.S. PATENT DOCUMENTS

| 5,422,776 | A | 6/1995 | Thorson et al. |
|---|---|---|---|
| 5,537,272 | A | 7/1996 | Kazmierczak et al. |
| 5,621,588 | A | 4/1997 | Williams et al. |
| 5,655,641 | A | 8/1997 | Ament et al. |
| 5,811,678 | A | 9/1998 | Hirano |
| 6,082,186 | A * | 7/2000 | Detwiler ..................... 73/66 |
| 6,135,684 | A | 10/2000 | Senzaki |
| 6,481,969 | B2 | 11/2002 | Berry et al. |
| 6,608,733 | B2 | 8/2003 | Elsing |
| 2004/0055144 | A1 | 3/2004 | Tran et al. |

* cited by examiner

*Primary Examiner*—A. J. Heinz
(74) *Attorney, Agent, or Firm*—James L. Johnson

(57) ABSTRACT

Multiple balancing plugs (114) preferably have a common length and a common offset center of gravity (130) in the length dimension for providing dual plane balancing of a rotatable body (100). The rotatable body (100) includes a plurality of balancing plug holes (112a–f) for receipt of a balancing plug (114) as desired/required to address an imbalance associated with the rotatable body (100). One or more balancing plugs (114) may be disposed within the rotatable body (100) in a first orientation such that their respective centers of gravity (130) are disposed within a first plane (134). One or more balancing plugs (114) may be disposed within the rotatable body (100) in a second, opposite orientation such that their respective centers of gravity (130) are disposed within a second plane (138) that is spaced from the first plane (134).

14 Claims, 13 Drawing Sheets

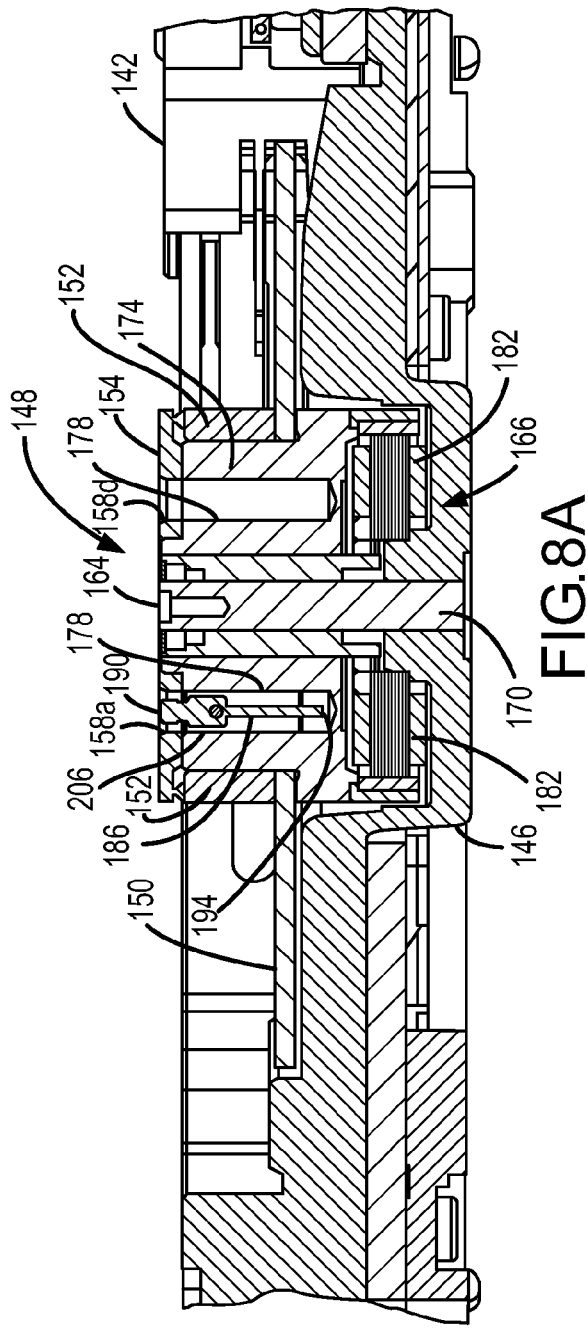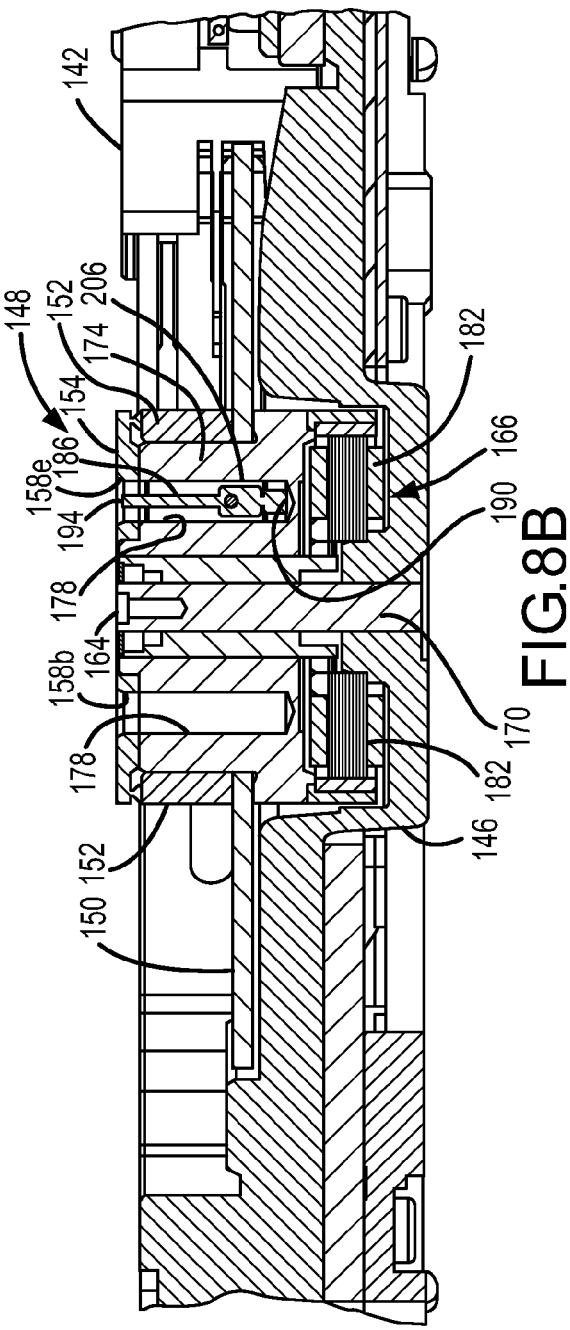

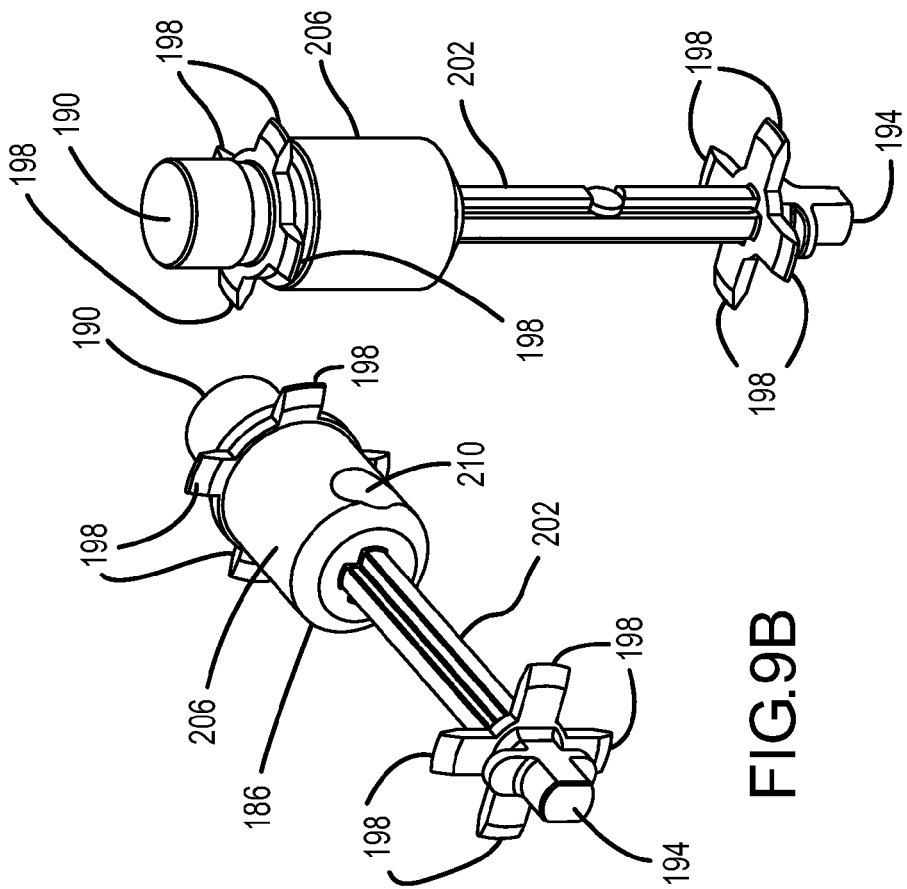
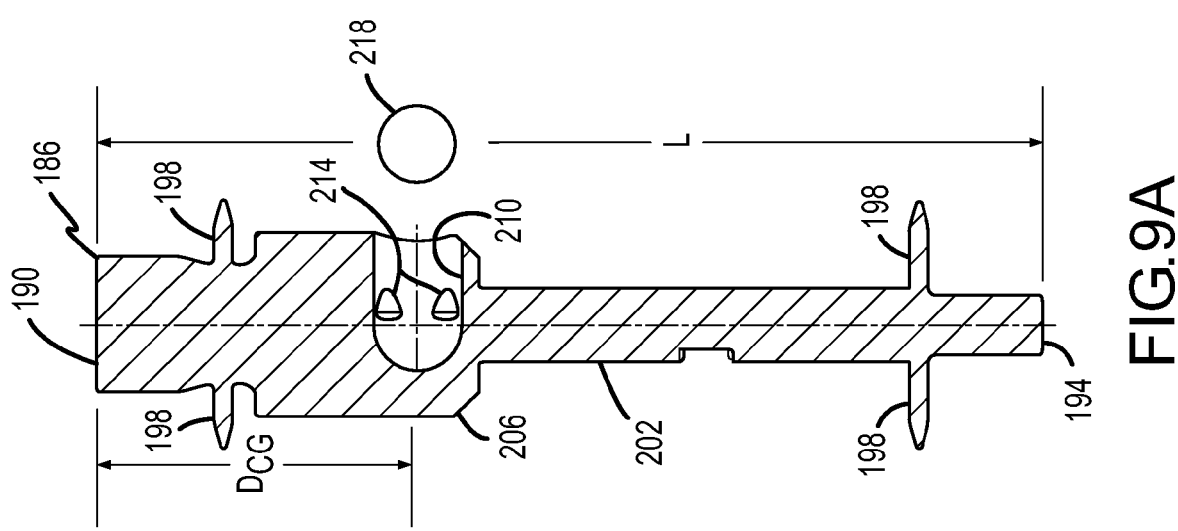
FIG.9C
FIG.9B
FIG.9A

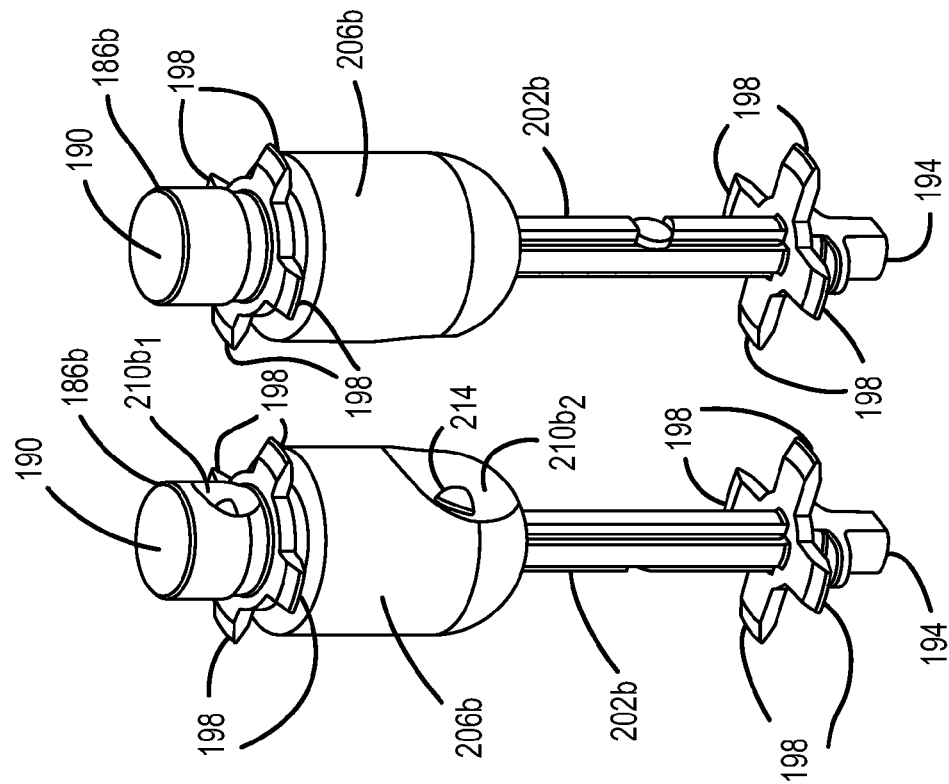
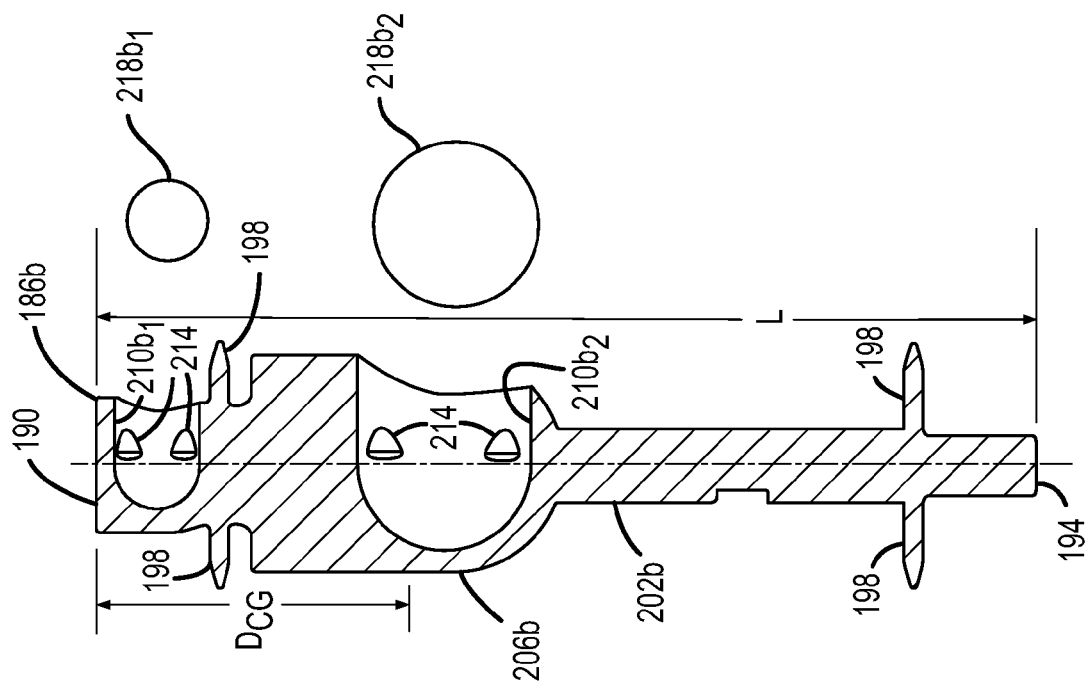
FIG.11A  FIG.11B  FIG.11C

BALANCING A ROTATABLE BODY IN MULTIPLE PLANES USING INVERTIBLE BALANCING PLUGS

CROSS-REFERENCE TO RELATED APPLICATIONS

This patent application is a divisional of and claims priority under 35 U.S.C. §120 to U.S. patent application Ser. No. 10/723,691, that was filed on Nov. 25, 2003, and is now U.S. Pat. No. 7,102,850, entitled "Balancing a Rotatable Body in Multiple Planes Using Invertible Balancing Plugs", and further claims priority to U.S. Patent Application Ser. No. 60/452,618, that was filed on Mar. 6, 2003, and that is entitled "Reversible Plug Capable of Dual Plane Balance." The entire disclosure of both U.S. patent application Ser. No. 10/723,691 and U.S. Patent Application Ser. No. 60/452,618 are incorporated by reference herein.

FIELD OF THE INVENTION

The present invention generally relates to rotating bodies and, more particularly, to balancing a rotatable body in at least two vertically spaced reference planes using balancing plugs with a known offset of their respective center of gravity that allows any such balancing plug to be used for balancing in either of two different, vertically spaced planes simply by inverting the position of the balancing plug in the rotatable body.

BACKGROUND OF THE INVENTION

Spindle motors are a commonly used in disk drives to simultaneously rotate each data storage disk being used by the disk drive. A stationary spindle or motor shaft of the spindle motor is anchored to the base plate of the disk drive. Each data storage disk is mounted on a rotatable hub of the spindle motor (e.g., using a disk clamp). The resulting combination will hereafter be referred to as a motor/disk assembly or as a disk pack. Multiple data storage disks would be mounted on the rotatable hub in vertically and equally spaced relation. One or more bearings are disposed between the spindle shaft and the rotatable hub that is disposed about the spindle shaft. Electromagnetic forces are used to rotate the hub about the stationary spindle at the desired velocity. Therefore, each data storage disk that is mounted on the hub also rotates about the stationary spindle shaft.

Concentric tracks are formed on each data storage disk used by the disk drive for storing information. The demand for increasing the data storage capacity of data storage disks has resulted in a corresponding increase in track density. Therefore, the read/write head(s) of the disk drive must be precisely positioned in order to avoid adversely affecting disk drive operations in some respect.

Another trend in the disk drive industry is increasing the rotational speed of the motor/disk assembly. Even a slight imbalance of the rotating motor/disk assembly may then generate rather significant forces that can adversely affect the ability to accurately position the read/write head(s) of the disk drive at the correct track of its corresponding data storage disk. Balancing of the motor/disk assembly is thereby commonly undertaken in the disk drive industry prior to shipping the drive to the customer. Single plane balancing of the motor/disk assembly that has been practiced in the disk drive industry commonly entails attaching one or more weights to one side of the motor/disk assembly. Not all imbalances may be alleviated to the desired degree by balancing within a single plane. Dual plane balancing of the motor/disk assembly has been practiced in the disk drive industry by attaching one or more weights at two different elevations corresponding with vertically spaced reference planes in an attempt to improve upon the potential inadequacies of a single plane balance. Notwithstanding the existence of dual plane balancing of the motor/disk assembly in the disk drive industry, there remains a need for improvement.

BRIEF SUMMARY OF THE INVENTION

The present invention generally relates to what may be characterized as a general balancing plug configuration that allows a balancing plug to be used to balance a rotatable body in either of two planes that are vertically spaced relative to a rotational axis of the motor/disk assembly, depending upon the orientation of the balancing plug in the rotatable body. This general configuration is one where a center of gravity of the balancing plug is designed to be offset in the length dimension of the balancing plug (i.e., closer to one end of the plug than its opposite end), with the location of this center of gravity being known. Assuming that a balancing plug of this general configuration is installed in the rotatable body such that it is disposed in at least somewhat of a vertical orientation (e.g., such that one end is "higher" than the other, and including without limitation where a length dimension of the plug is parallel with the rotational axis of the rotatable body), inverting the position of this balancing plug within the rotatable body will thereby change the elevation at which the center of gravity of this balancing plug is disposed within the rotatable body. Therefore, the same balancing plug may be used to balance in either of two vertically spaced planes in the motor/disk assembly, simply by inverting the position of the balancing plug within the rotatable body and assuming that the "upper" end of the balancing plug is disposed at a common elevation in either instance.

A first aspect of the present invention is embodied by a rotatable body that is rotationally balanced by a plurality of balancing plugs. Each balancing plug has a first end and a second end. The center of gravity of each balancing plug is closer to its first end than to its second end. That is, the center of gravity of each balancing plug is offset in the direction of its corresponding first end. A first balancing plug is disposed within a first hole of the rotatable body, while a second balancing plug is disposed within a second hole of the rotatable body. The first and second balancing plugs are positioned within their corresponding first and second holes in the rotatable body such that the position of the second balancing plug is inverted in relation to the position of the first balancing plug. For instance, if the first balancing plug is disposed with its first end being higher than its second end, then the second balancing plug is disposed with its second end being higher than its first end to provide dual plane balancing via the first and second balancing plugs. Similarly, if the first balancing plug is disposed with its second end being higher than its first end, then the second balancing plug is disposed with its first end being higher than its second end to provide dual plane balancing via the first and second balancing plugs.

Various refinements exist of the features noted in relation to the first aspect of the present invention. Further features may also be incorporated in the first aspect of the present invention as well. These refinements and additional features may exist individually or in any combination. The rotatable body may be in the form of a motor/disk assembly of a disk drive. This motor/disk assembly may include a motor of any appropriate type (e.g., a spindle motor; a motor configuration that uses electromagnetic forces to provide the desired rotation). One or more data storage disks may be utilized by the motor/disk assembly, including a single data storage disk or multiple data storage disks. Multiple data storage disks would typically be disposed in equally spaced and parallel relation within the motor/disk assembly. The multiple plane balancing provided by the first aspect may be used with any appropriate configuration of a motor/disk assembly.

The rotatable body associated with the first aspect may include a plurality of balancing plug holes that are equally spaced about an axis about which the rotatable body rotates (hereafter a rotational axis) on a common reference circle (e.g., on the same bolt circle) having its center coinciding with this rotational axis, and which includes at least the noted first and second balancing plug holes. Each balancing plug hole used by the rotatable body in relation to the first aspect may be disposed so as to be parallel with the rotational axis of the rotatable body, although the balancing plugs could be slanted in a symmetrical fashion about the rotational axis as well. Another characterization of each balancing plug hole used by the rotatable body in relation to the first aspect is that these holes may be symmetrically disposed relative to the rotational axis of the rotatable body, although again not necessarily parallel with the rotational axis.

Although the first and second balancing plugs that are used in relation to the first aspect have a common characteristic in the form of their center of gravity being offset toward one of its two ends, the first and second balancing plugs need not be of the same configuration and/or weight. The first and second balancing plugs may have different configurations so long as their respective center of gravity is offset more toward one end than the other. However, the first and second balancing plugs may also be of the same configuration. In both cases, the first and second balancing plugs each may have a body that is of the same density or of a different density, may be of the same or a different weight, or any combination thereof. The body for both the first and second balancing plugs may include at least one receptacle for receiving and retaining a balancing weight of any appropriate configuration (e.g. spherical), of any appropriate material, of any appropriate density, and of any appropriate weight. Multiple balancing weight receptacles may be spaced along the body of one or both of the first and second balancing plugs in the length dimension as well.

The center of gravity of the first balancing plug may be spaced from its first end by a first distance in relation to the first aspect, while the second balancing plug may be spaced from its first end by a second distance that is either the same as or different from the first distance in the case of the first aspect. The length of the first and second balancing plugs also may be the same or different as well. Preferably, the first and second balancing plugs are of the same length, and have their respective centers of gravity disposed a common distance from their respective first end. Moreover, preferably the first and second balancing plugs are installed in the rotatable body such that their "upper" ends are disposed within a common reference plane that is perpendicular to the rotational axis of the rotatable body (i.e., such that the first and second balancing plugs are disposed at a common elevation within the rotatable body).

In one embodiment of the first aspect, the first and second balancing plugs are selected from a kit or collection of balancing plugs that are specific to balancing the rotatable body, but each of which has its center of gravity offset toward one of its two ends. This kit may include a plurality of balancing plug configurations, and each balancing plug configuration may be available in one or more weights (e.g., by changing the density of all or part of the balancing plug configuration). For instance, the weight of a given balancing plug configuration may be established by the density of its body, by the number of balancing weight receptacles (if any) included on its body, by the density of any balancing weight(s) disposed within a particular balancing weight receptacle on its body, by the size of any balancing weight(s), or any combination thereof. Preferably, each balancing plug within the noted kit is of the same length, and with the center of gravity of each balancing plug being located the same distance from one of its ends. That is, the center of gravity of each such balancing plug within the kit would be disposed at the same offset location between its two ends (i.e., the center of gravity being located other than at the longitudinal midpoint of the balancing plug, but being the same from plug-to-plug). In any case, any balancing plug from the noted kit having a known offset center of gravity may be used to balance the rotatable body in either of two different planes, simply by inverting the position of the balancing plug within the rotatable body.

Both the first and second balancing plugs have a center of gravity that is offset toward one end in the case of the first aspect. This provides an asymmetrical configuration for both the first and second balancing plugs in at least the length dimension. Preferably, the first and second balancing plugs also have a common length and a common spacing between their corresponding center of gravity and one of their corresponding ends as noted. That is, in addition to the first and second balancing plugs preferably being of the same length, the center of gravity of the first balancing plug may be disposed a first distance from one end of the first balancing plug, the center of gravity of the second balancing plug may be disposed a second distance from one end of the second balancing plug, and preferably the first and second distances are equal. As such, the first and second balancing plugs may be disposed at a common elevation within the rotatable body, but their corresponding centers of gravity will then be disposed at different elevations within the rotatable body to provide balancing in two vertically spaced planes since the position of the first balancing plug will be inverted in relation to the position of the second balancing plug. That is, the first balancing plug may be used to balance the rotatable body in one of two different planes, simply by inverting the position of the first balancing plug within the first hole in the case of the first aspect. Similarly, the second balancing plug may be used to balance the rotatable body in one of two different planes, simply by inverting the position of the second balancing plug within the second hole.

The general configuration of the balancing plugs used in relation to the first aspect provides a number of advantages. One is that all balancing plugs may be installed from a common side of the rotatable body, and yet still provide balancing in at least two vertically spaced planes (e.g., dual plane balancing). Since all balancing plugs may be installed from a common side of the rotatable body and for the case when the same is in the form of a disk drive motor/disk assembly, this also allows the balancing to be undertaken at a time when the motor/disk assembly is installed within the disk drive. In one embodiment, the balancing in accordance with the first aspect is done at a time when the motor/disk assembly is rotatably mounted on a base plate of the disk drive. However, balancing of the motor/disk assembly in accordance with the first aspect could be undertaken prior to installing the same on the base plate.

Each balancing plug used in relation to the first aspect may include at least one flexible flange. Any such flexible flange may be used to retain the balancing plug in a desired vertical position within its corresponding balancing plug hole in the rotatable body by a frictional engagement. The outer diameter of each such flexible flange may be such that it is flexed inwardly when directing the corresponding balancing plug within its corresponding balancing plug hole in the rotatable body and into the desired vertical position. The resulting "outwardly directed" flexing of each flange on each balancing plug preferably establishes a sufficient frictional engagement with a wall defining its corresponding balancing plug hole to retain the balancing plug in a desired vertical position in the rotatable body. Although having one or more flexible flanges at a single location along the length of the balancing plug may generate sufficient forces to retain the balancing plug in a desired vertical position within its corresponding balancing plug hole, having one or more of these flanges at multiple locations along the length of the balancing plug may facilitate the use of the same in either of two positions in at least some cases where the rotatable body is in the form of a motor/disk assembly (e.g., to balance in either of two different planes simply by inverting the balancing plug). Other ways of maintaining each balancing plug in a desired vertical position within its corresponding balancing plug hole may be appropriate.

One or more balancing plugs may be used to provide balancing within one plane in accordance with the first aspect, while one or more balancing plugs may be used to provide balancing within a different plane in accordance with the first aspect. These planes are parallel to each other and are separated by a distance of at least about 1 millimeter in one embodiment, are separated by a distance of at least about 2 millimeters in another embodiment, and are separated by a distance of about 4 millimeters in yet another embodiment. More specifically, one or more balancing plugs may be positioned within the rotatable body in a common first orientation so that the center of gravity of each such plug is disposed within a first plane that is perpendicular to a rotational axis of the rotatable body, while one or more balancing plugs may be positioned within the rotatable body in a common second orientation (that is different from the first orientation, and preferably directly opposite of the same) so that the center of gravity of each such plug is disposed with a second plane that is spaced from and parallel with the first plane. Therefore, each of the balancing plugs used in relation to the first aspect may be disposed at the same vertical position with the rotatable body, but the center of gravity of each such plug will be disposed in either the first plane or the second plane. As noted above in relation to the discussion regarding a kit of balancing plugs from which the first and second balancing plugs may be selected for use in relation to the first aspect, preferably each of these balancing plugs are of the same length and have a common offset center of gravity in the length dimension. It should be appreciated that the position and weight of the balancing plug(s) used to provide balancing within the first plane will be selected to provide a counterbalancing force of a desired magnitude and direction within the first plane, and that the position and weight of the balancing plug(s) used to provide balancing within the second reference plane will be selected to provide a counterbalancing force of a desired magnitude and direction within the second reference plane.

The various balancing plugs used in relation to the first aspect need not utilize the same offset of their corresponding center of gravity. This would allow multiple balancing plugs to be installed in the rotatable body and provide balancing in more than two vertically spaced reference planes, even when installed at a common elevation within the rotatable body. Consider the case where three or more balancing plugs are installed in the rotatable body. These three balancing plugs may be installed at a common elevation and provide balancing in three reference planes that are perpendicular to the rotational axis of the rotatable body and that are spaced along this rotational axis. In the case of the first aspect, at least one of the balancing plugs would be inverted in relation to at least one other balancing plug when installed in the rotatable body.

As noted above where the rotatable body is in the form of a motor/disk assembly, the installation of the first and second balancing plugs may be done at a time when the motor/disk assembly is already mounted on a base plate of a disk drive in the case of the first aspect. A cover may be mounted on the base plate after the first and second balancing plugs have been installed and to "enclose" the motor/disk assembly between the cover and base plate (as well as various other disk drive components). One or more concentrically disposed data storage tracks may thereafter be formed on at least one data storage surface of at least one data storage disk of the motor/disk assembly (e.g., a servo writing operation may be undertaken after the motor/disk assembly has been balanced, and further after the motor/disk assembly has been disposed between a cover and base plate of the disk drive).

A second aspect of the present invention is embodied by a rotatable body of a disk drive that is rotationally balanced by a plurality of balancing plugs. Each balancing plug is of the same length (has a common distance between first and second ends) and has a common spacing between its center of gravity and its first end. The center of gravity of each balancing plug is also offset in the direction of its first end. That is, the center of gravity of each balancing plug is closer to the first end than to its second end. A balancing force is defined in a first plane by disposing at least one balancing plug in a corresponding hole of the rotatable body. Similarly, a balancing force is defined in a different, second plane by disposing at least one balancing plug in a corresponding hole of the rotatable body. Each balancing plug that is used to define the balancing force within the first plane has its first end disposed at a first elevation within the rotatable body, while each balancing plug that is used to define the balancing force within the second plane has its second end disposed at the first elevation within the rotatable body. That is, the first end of each balancing plug used to define a balancing force within the first plane is coplanar with the second end of each balancing plug that is used to define a balancing force within the second plane.

Various refinements exist of the features noted in relation to the second aspect of the present invention. Further features may also be incorporated in the second aspect of the present invention as well. These refinements and additional features may exist individually or in any combination. The rotatable body may be in the form of a motor/disk assembly for a disk drive. This motor disk assembly may include a motor of any appropriate type (e.g., a spindle motor; a motor configuration that uses electromagnetic forces to provide the desired rotation). One or more data storage disks may be utilized by the motor/disk assembly, including a single data storage disk or multiple data storage disks. Multiple data storage disks would typically be disposed in equally spaced and parallel relation within the motor/disk assembly. The balancing provided by the second aspect may be used with any appropriate configuration of a motor disk assembly.

The rotatable body associated with the second aspect may include a plurality of balancing plug holes that are equally spaced about an axis about which the rotatable body rotates (hereafter a rotational axis) on a common reference circle (e.g., on the same bolt circle) having its center coinciding with this rotational axis. Each balancing plug hole used by the motor/disk assembly in relation to the second aspect may be disposed so as to be parallel with the rotational axis of the rotatable body, although the balancing plug holes could be slanted in a symmetrical fashion about the rotational axis as well. Another characterization of each balancing plug hole used by the rotatable body in relation to the second aspect is that these holes may be symmetrically disposed relative to the rotational axis of the rotatable body, although again not necessarily parallel with the rotational axis.

Each balancing plug used in relation to the second aspect may be used to balance the rotatable body in one of two different planes, simply by inverting its position within the motor/disk assembly. Although the balancing plugs that are used in relation to the second aspect are each of the same length, have a center of gravity that is offset more toward one of its ends than the other, and have the same spacing between their corresponding center of gravity and their first end, this does not require each balancing plug used by the second aspect to be of the same configuration and/or weight. Any combination of configuration and weight may be used for each balancing plug in relation to the second aspect, so long as the above-noted criteria are met. Each balancing plug may include at least a body. The body of one or more balancing plugs used in relation to the second aspect may include at least one receptacle for receiving and retaining a separate balancing weight of any appropriate configuration (e.g. a spherical), of any appropriate material, of any appropriate density, and of any appropriate weight. Multiple balancing weight receptacles may be spaced along the length dimension of the body of one or more of the balancing plugs in the case of the second aspect as well.

The first end of each balancing plug used to define a balancing force in the first plane in accordance with the second aspect, as well as the second end of each balancing plug used to define a balancing force in the second plane again are disposed at the same elevation within the rotatable body. This then disposes the center of gravity of each balancing plug used in relation to the second aspect either within the first plane or within the second plane. In one embodiment, the first and second planes are parallel to each other, are perpendicular to a rotational axis of the rotatable body, and are separated by a distance of at least about 1 millimeter in one embodiment, are separated by a distance of at least about 2 millimeters in another embodiment, and are separated by a distance of about 4 millimeters in yet another embodiment.

In one embodiment of the second aspect, all balancing plugs are selected from a kit or collection of balancing plugs that are specific to the rotatable body. This kit may include a plurality of balancing plug configurations, and each balancing plug configuration may be available in one or more weights (e.g., by changing the density of all or part of the balancing plug configuration). For instance, the weight of a given balancing plug configuration may be established by the density of its body, by the number of balancing weight receptacles included on its body, by the density of the balancing weight(s) disposed within a particular receptacle on its body, or any combination thereof. Preferably, each balancing plug within the noted kit is of the same length, and with the center of gravity of each balancing plug being located the same distance from one of its ends. This then allows a balancing plug within the noted kit to be used to balance the rotatable body in two different planes, simply by inverting the position of the balancing plug within the rotatable body.

The nature of the balancing plugs used in relation to the second aspect provides a number of advantages. One is that all balancing plugs may be installed from a common side of the rotatable body, and yet still provide balancing in two vertically spaced planes (e.g., dual plane balancing). Since all balancing plugs may be installed from a common side of the rotatable body and for the case where the same is in the form of a disk drive motor/disk assembly, this also allows the balancing to be undertaken at a time when the motor/disk assembly is installed within the disk drive. In one embodiment, the balancing in accordance with the second aspect is done at a time when the motor/disk assembly is rotatably mounted on a base plate of the disk drive. However, balancing of the motor/disk assembly in accordance with the second aspect could be undertaken prior to installing the same in the disk drive.

Each balancing plug used in relation to the second aspect may include at least one flexible flange. Any such flexible flange may be used to retain the balancing plug in a desired vertical position within its corresponding balancing plug hole in the rotatable body by a frictional engagement. The outer diameter of each such flexible flange may be such that it is flexed inwardly when directing the corresponding balancing plug within its corresponding balancing plug hole in the motor/disk assembly and into the desired vertical position. The resulting "outwardly directed" flexing of each flange on each balancing plug establishes a sufficient frictional engagement with a wall defining its corresponding balancing plug hole to retain the balancing plug in a desired vertical position in the rotatable body. Although one or more flexible flanges at a single location along the length of the balancing plug may generate sufficient forces to retain the balancing plug in a desired vertical position within its corresponding balancing plug hole, having one or more of these flanges at multiple locations along the length of the balancing plug may facilitate the use of the same in either of two positions in at least some cases where the rotatable body is in the form of a motor/disk assembly (e.g., to balance in either of two different planes simply by inverting the balancing plug). Other ways of maintaining each balancing plug in a desired vertical position within its corresponding balancing plug hole may be appropriate.

One or more balancing plugs may be used to provide balancing within one plane in accordance with the second aspect, while one or more balancing plugs may be used to provide balancing within a different plane in accordance with the second aspect. In one embodiment, these planes are parallel to each other and are separated by a distance of at least about 1 millimeter in one embodiment, are separated by a distance of at least about 2 millimeters in another embodiment, and are separated by a distance of about 4 millimeters in yet another embodiment. More specifically, one or more balancing plugs may be positioned within the motor/disk assembly in a common first orientation so that the center of gravity of each such plug is disposed within a first plane that is perpendicular to a rotational axis of the rotatable body, while one or more balancing plugs may be positioned within the rotatable body in a common second orientation (that is different from the first orientation, and preferably directly opposite of the same) so that the center of gravity of each such plug is disposed with a second plane that is spaced from and parallel with the first plane. Therefore, each of the balancing plugs used in relation to the second aspect may be disposed at the same vertical position within the rotatable body, but the center of gravity of each such plug will be disposed in either the first plane or the second plane. As noted above in relation to the discussion regarding a kit of balancing plugs from which multiple balancing plugs may be selected for use in relation to the second aspect, preferably each of these balancing plugs are of the same length and have a common offset center of gravity in the length dimension. It should be appreciated that the position and weight of the balancing plug(s) used to provide balancing within the first plane will be selected to provide a counterbalancing force of a desired magnitude and direction within the first plane, and that the position and weight of the balancing plug(s) used to provide balancing within the second reference plane will be selected to provide a counterbalancing force of a desired magnitude and direction within the second reference plane.

As noted above where the rotatable body is in the form of a motor/disk assembly, the first and second balancing steps may be done at a time when the motor/disk assembly is already mounted on a base plate of a disk drive in the case of the second aspect. A cover may be mounted on the base plate after the first and second balancing steps have been performed and to "enclose" the motor/disk assembly between the cover and base plate (as well as various other disk drive components). One or more concentrically disposed data storage tracks may thereafter be formed on at least one data storage surface of at least one data storage disk of the motor/disk assembly (e.g., a servo writing operation may be undertaken after the motor/disk assembly has been balanced, and further after the motor/disk assembly has been disposed between a cover and base plate of the disk drive).

BRIEF DESCRIPTION OF THE SEVERAL VIEWS OF THE DRAWING

FIG. 8A is a cross-sectional view of the motor/disk assembly of FIG. 7, taken along line A—A.

FIG. 8B is a cross-sectional view of the motor/disk assembly of FIG. 7, taken along line B—B.

FIG. 9A is an enlarged cross-sectional view of one embodiment of an invertible balancing plug for balancing in either of two vertically spaced planes of a motor/disk assembly depending upon its orientation therein, and that is shown in one orientation in FIG. 8A for balancing in an upper plane, and that is shown in an inverted orientation in FIG. 8B for balancing in a lower plane.

FIGS. 9B–C are perspective views of the balancing plug of FIG. 9A.

FIG. 11A is an enlarged cross-sectional view of another embodiment of an invertible balancing plug for balancing in either of two vertically spaced planes of a motor/disk assembly depending upon its orientation therein.

FIGS. 11B–C are perspective views of the balancing plug of FIG. 11A.

DETAILED DESCRIPTION OF THE INVENTION

Figure 1:
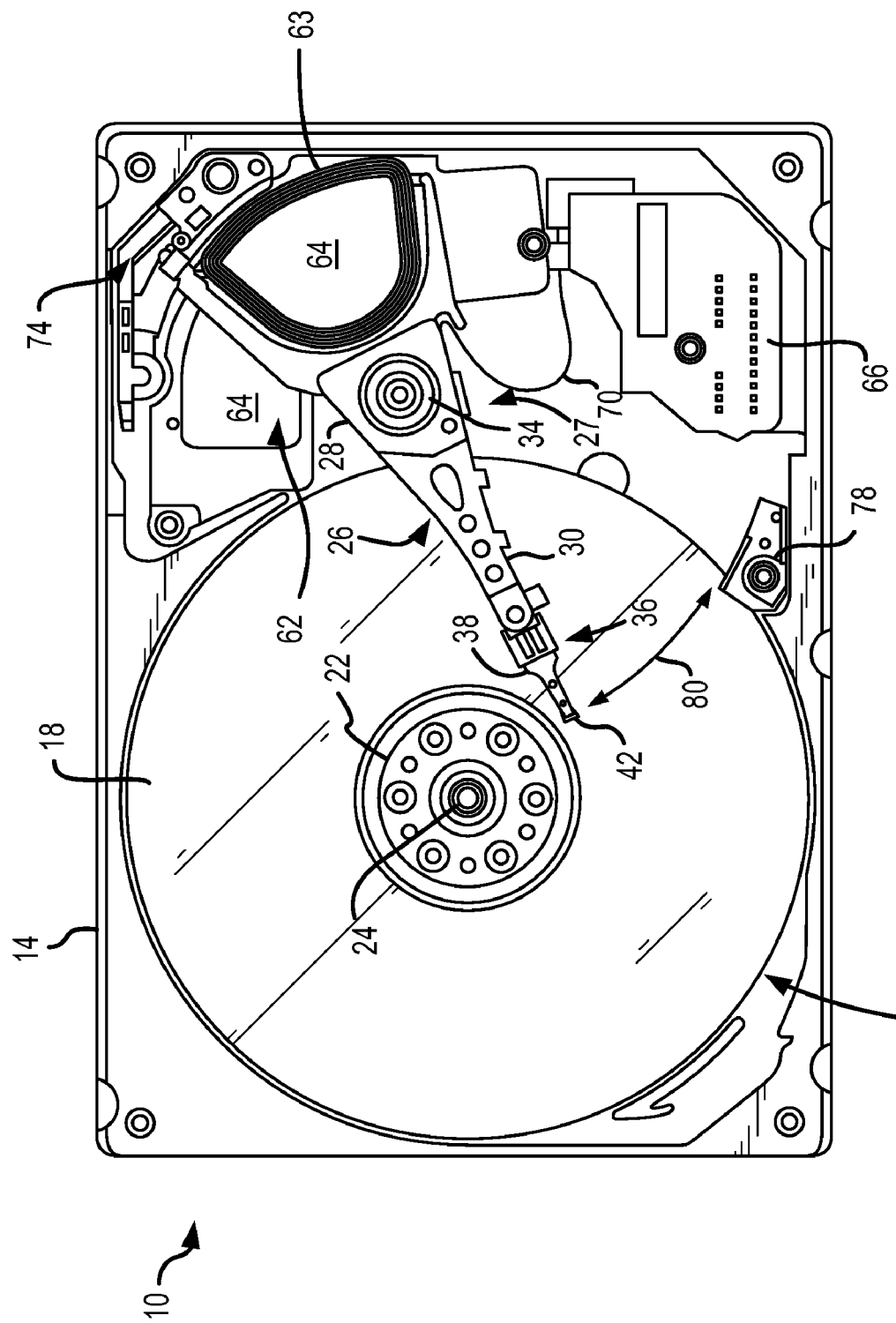
FIG. 1 is a top or plan view of one embodiment of a disk drive.
Figure 2:
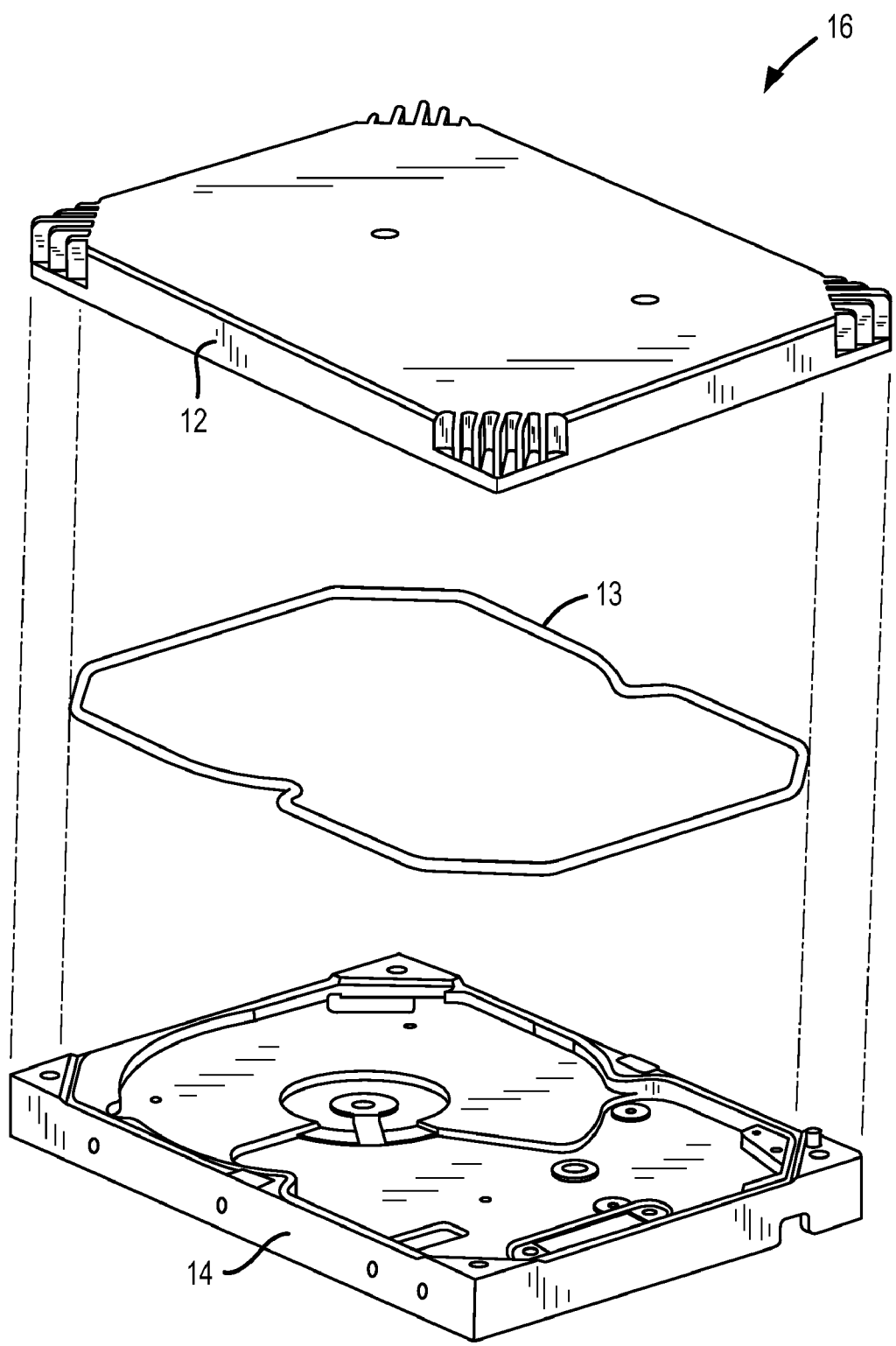
FIG. 2 is an exploded, perspective view of one embodiment of a disk drive housing that may be utilized by the disk drive of FIG. 1.

The present invention will now be described in relation to the accompanying drawings that at least assist in illustrating its various pertinent features. One embodiment of a disk drive 10 is illustrated in FIGS. 1–4. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub by a disk clamp 22, and the hub is rotatably interconnected with the disk drive base plate 14 and/or cover 12. Multiple data storage disks 18 would be mounted in vertically spaced and parallel relation on the hub and may be characterized as a hard disk assembly or HDA 17. A spindle motor rotates the hub and attached clamp 22 about a shaft 24 of the spindle motor to simultaneously spin the data storage disk(s) 18 at an appropriate rate.

The disk drive 10 also includes a head stack assembly or HSA 26, that in turn includes an actuator 27. The actuator 27 is in the form of an actuator body 28 having one or more individual rigid actuator arms 30 extending therefrom. This actuator body 28 is mounted on a pivot bearing 34. Each actuator arm 30 pivots about the pivot bearing 34, which in turn is rotatably supported by the base plate 14 and/or cover 12. Multiple actuator arms 30 would be disposed in vertically spaced relation, with one actuator arm 30 typically being provided for each major data storage surface of each data storage disk 18 of the disk drive 10. Other actuator configurations could be utilized as well, such as an "E" block having one or more rigid actuator arm tips or the like that cantilever from a common structure, or one or more rigid actuator arms that are each mounted on the pivot bearing 34.

Movement of the actuator 27 is provided by an appropriate head stack assembly drive, such as a voice coil motor 62 or the like. The voice coil motor 62 may be characterized as a rotary drive. The voice coil motor 62 is a magnetic assembly that controls the movement of the actuator 27 under the direction of control electronics 66. Typical components of the voice coil motor 62 are a coil 63 that may be mounted on the actuator 27, and a separate magnet 64 that is disposed above and below this coil 63 (the upper magnet not being shown in FIG. 1). The magnets 64 will typically be mounted on the housing 16. Any appropriate head stack assembly drive type may be utilized by the disk drive 10, including a linear drive (for the case where the actuator 27 is interconnected with the base plate 14 and/or cover 12 for linear movement versus the illustrated pivoting movement about the pivot bearing 34), as well as other types of rotational/pivoting drives.

A head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the HSA 26. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head 44 is interconnected with the control electronics 66 of the disk drive 10 by a flex cable 70 that is typically mounted on the actuator arm assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 along a path 80 and "across" the corresponding data storage disk 18 to position the head 44 at the desired/required radial position on the disk 18 (i.e., at the correct track on the data storage disk 18) for disk drive read/write operations.

When the disk drive 10 is not in operation, the actuator 27 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 includes a ramp assembly 78 that is disposed beyond a perimeter of the data storage disk 18 in the illustrated configuration to typically both move the corresponding slider 42 vertically away from its corresponding data storage disk 18 and to also exert somewhat of a retaining force on the corresponding actuator arm 30. Any configuration for the ramp assembly 78 that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 includes an actuator arm assembly latch 74 that moves from a non-latching position to a latching position to engage an actuator arm 30 so as to preclude the same from pivoting in a direction which would tend to drag the slider(s) 42 across its corresponding data storage disk 18.

Figure 3:
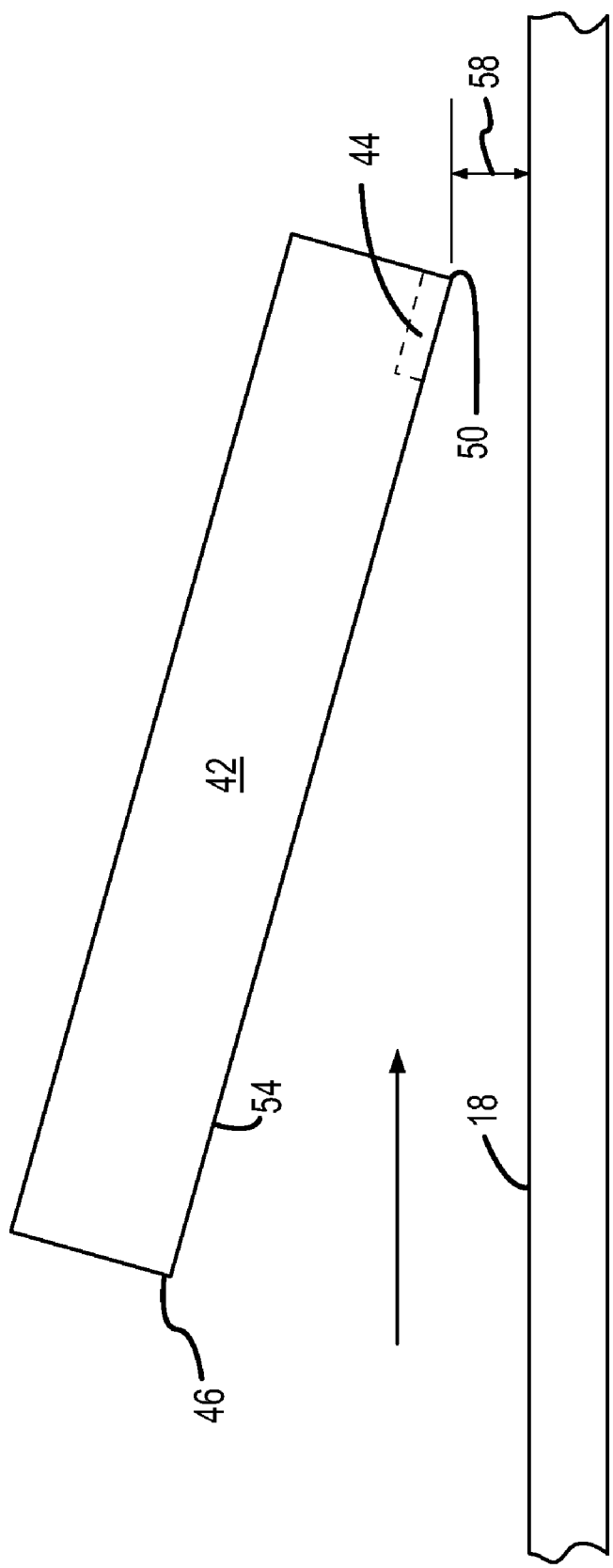
FIG. 3 is a side view of one embodiment of a flying-type slider that may be used by the disk drive of FIG. 1.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The transducer(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
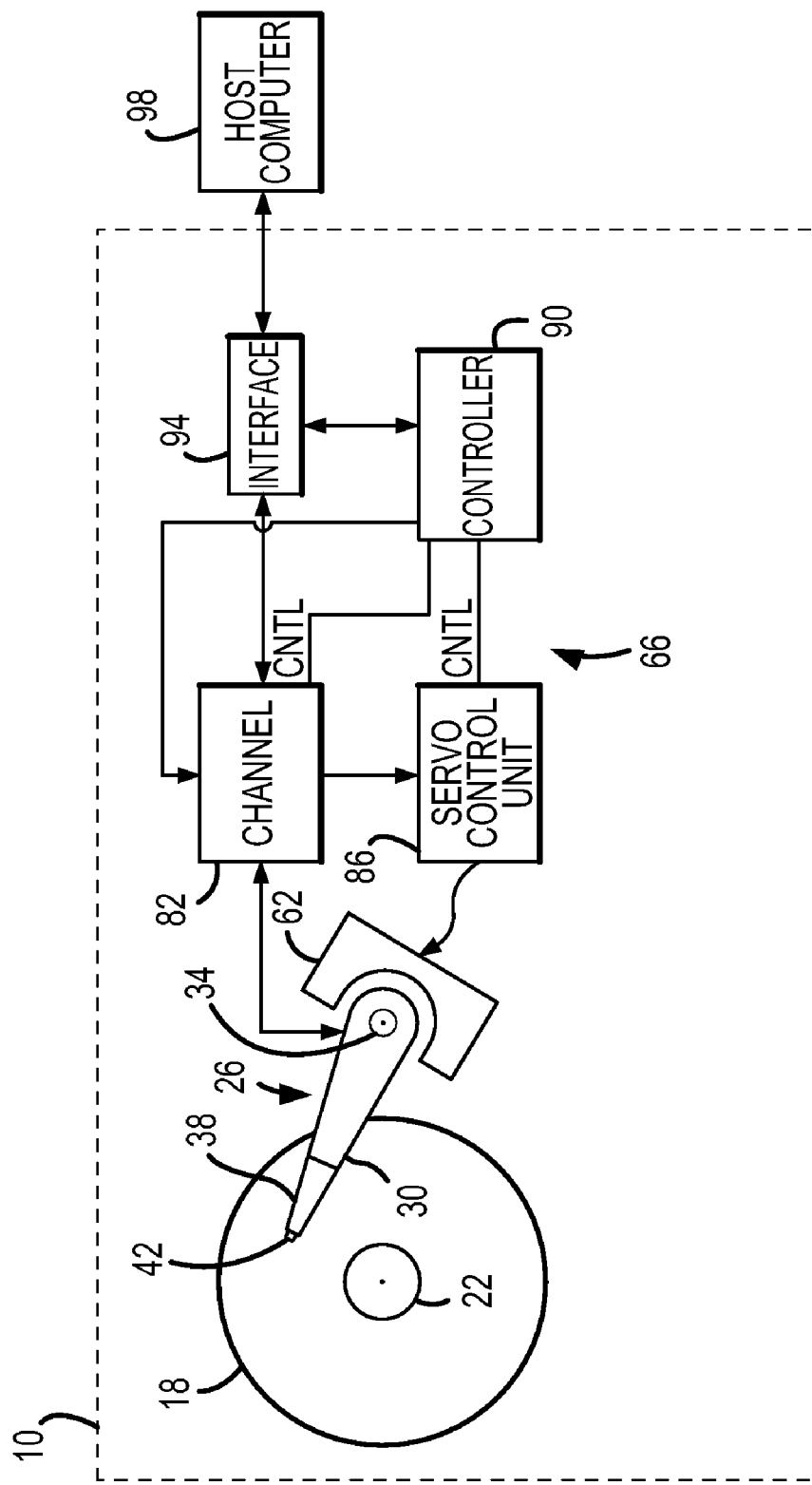
FIG. 4 is a simplified electrical component block diagram of the disk drive of FIG. 1.

FIG. 4 illustrates a simplified electrical component block diagram of the disk drive 10 of FIG. 1. The control electronics 66 in this case includes a controller 90 and a servo control unit 86. The disk drive 10 in FIG. 4 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In one embodiment, the data storage disk 18 includes a magnetic media having concentric read/write tracks and the head 44 includes at least one transducer that is capable of communicating with this magnetic data storage disk 18.

The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal and external, such as the host computer 98, which is again interconnected with the disk drive 10 via the interface 94. One operation of the channel 82 is to receive an analog signal from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

The controller 90 controls the timing and operation of other elements of the disk drive 10. The controller 90 receives input/output requests from the host computer 98 via the interface 94. Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98. Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98.

Figure 5:
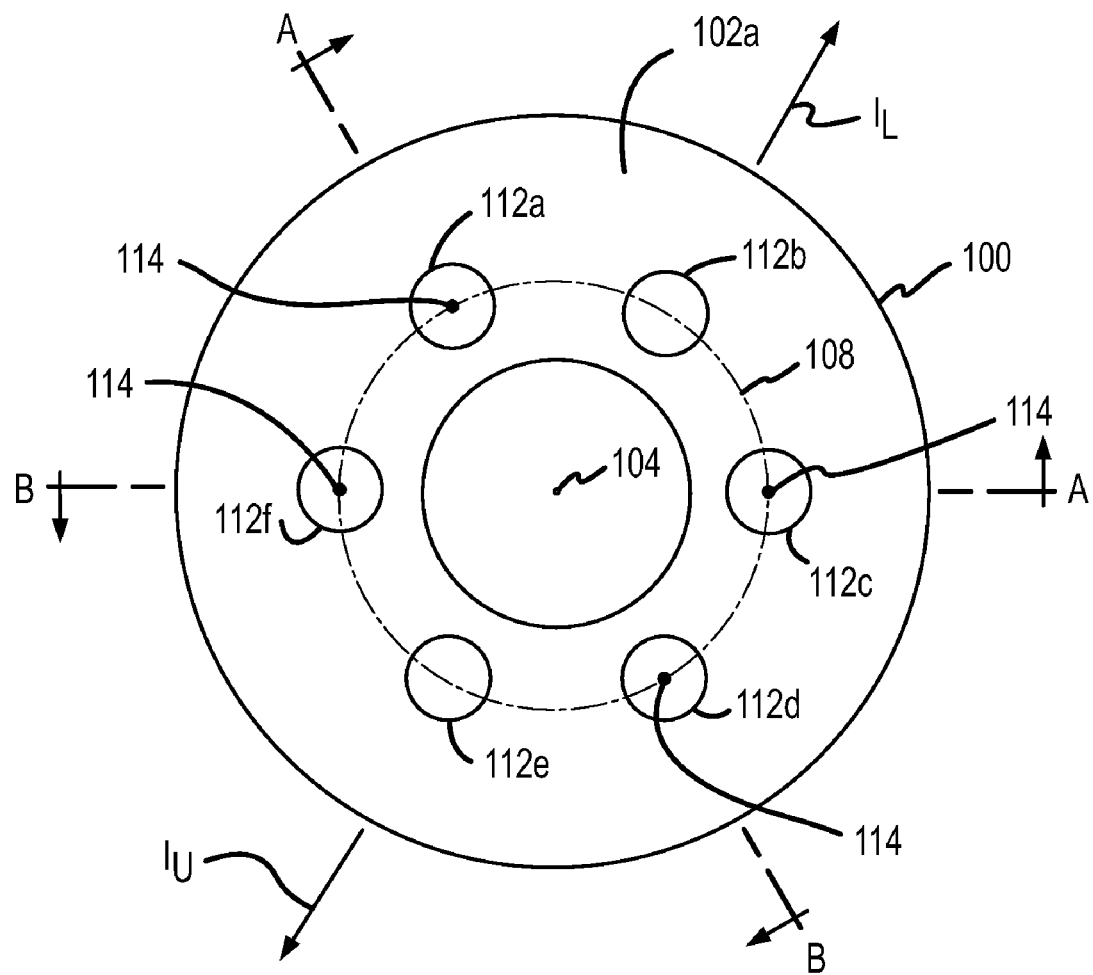
FIG. 5 is a top view of one embodiment of a rotatable body having a plurality of balancing plug holes in which invertible balancing plugs may be disposed to provide balancing in multiple, vertically spaced reference planes.

Both the track density of the data storage disk(s) 18 of the disk drive 10, and the speed at which the disk(s) 18 rotates, continues to be increased. Rotational imbalances can become significant and adversely affect disk drive performance to an undesired degree. One embodiment of a rotatable body that accommodates balancing in multiple planes to address a rotational imbalance is illustrated in FIG. 5, is identified by reference numeral 100, and may be in the form of a hub of a disk drive motor/disk assembly. The rotatable body 100 in this case may be used by any disk drive design having a motor for rotating one or more data storage disks during disk drive operations, including the disk drive 10 discussed above in relation to FIGS. 1–4. One or more data storage disks would be appropriately mounted on the rotatable body 100 for rotation about an axis 104. However, the rotatable body 100 may be for any appropriate application.

A plurality of balancing plug holes 112a–f extend at least within the rotatable body 100, are disposed on a common reference circle 108 having a center coinciding with the rotational axis 104, and are accessible from a common side or end 102a of the rotatable body 100. The balancing plug holes 112a–f may extend partially through or all the way through the rotatable body 100. Although the balancing plug holes 112a–f will most typically be disposed parallel with the rotational axis 104, other orientations may be appropriate so long as the balancing plug holes 112a–f are symmetrically disposed about the rotational axis 104 (e.g., a "slanted" orientation where the "upper" end of each particular balancing plug hole 112a–f is disposed closer to the rotational axis 104 than its opposite "lower" end, or vice versa). Although six balancing plug holes 112a–f are utilized in the illustrated embodiment, any appropriate number may be used. The balancing plug holes 112a–f of the rotatable body 100 are disposed such that an appropriate weight may be disposed therein for addressing an imbalance of a motor/disk assembly for a disk drive that includes the rotatable body 100. In this regard and referring to FIGS. 6A–B, what may be characterized as an invertible balancing plug 114 may be disposed in any one or more of the balancing plug holes 112a–f to address an imbalance associated with the rotatable body 100. Only one of the balancing plugs 114 need be described, as each of the balancing plugs 114 will have the same characteristics.

The balancing plug 114 that may be used in relation to the rotatable body 100 for balancing in either of two different planes (by inverting its orientation within the rotatable body 100) is an elongate structure having a length dimension extending between a first end 116a and a second end 116b. The balancing plug 114 includes a body 118 having an enlarged head 122 that is disposed closer to the first end 116a than to the second end 116b for purposes of offsetting a center of gravity 130 toward the first end 116a. The body 118 and/or head 122 may be of any appropriate configuration. The main requirement for allowing any given balancing plug 114 to be able to realize balancing of the rotatable body 100 in two different planes simply by inverting the position of the balancing plug 114 (e.g., to be able to balance in one plane by being in a first orientation in a particular balancing plug hole 112a–f, and to be able to balance in another plane by being in a second orientation in a particular balancing plug hole 112a–f) is that a center of gravity 130 of each such balancing plug 114 must be offset in the direction of either its first end 116a or its second end 116b (i.e., the center of gravity 130 cannot be disposed midway between its first end 116a and its second end 116b). This allows the balancing plug 114 to be in a first orientation for providing a balancing force in an upper plane, and to be inverted to a second, opposite orientation for providing a balancing force in a lower plane. A number of additional features may be and are preferably incorporated into the design of each plug 114 used to balance the rotatable body 100 to simplify the balancing process (e.g., to simplify an algorithm that may be used to determine the position and weight of one or more plugs 114 in the rotatable body 100 to attempt to balance the same). One is that each balancing plug 114 used to balance the rotatable body 100 is preferably of the same length (i.e., the same distance between its first end 116a and its second end 116b). Another is that preferably the distance between the center of gravity 130 and the first end 116a is preferably the same for each of the balancing plugs 114 that is used to balance the rotatable body 100. In any case, a plurality of balancing plugs 114 for balancing the rotatable body 100 may be of one or more configurations, may be of one or more materials, may be of one or more densities, may be of one or more weights, or any combination thereof.

A pair of flexible flanges 126 of any appropriate configuration are spaced along the body 118 of the balancing plug 114 (i.e., longitudinally spaced) for retaining the balancing plug 114 in a desired vertical position within the rotatable body 100. One flange 126 is disposed on each side of the center of gravity 130. An outer diameter (actual diameter if a single flange is disposed at one longitudinal location, or effective diameter if multiple flanges or flange segments are disposed at the same longitudinal location) defined by each flange 126 is larger than the diameter of the particular balancing plug hole 112a–f in which the balancing plug 114 is disposed. Therefore, the free end of each flange 126 deflects toward the body 118 (or a central longitudinal reference axis along which the balancing plug 114 extends) when the balancing plug 114 is disposed in a particular balancing plug hole 112a–f. The attempt of the flanges 126 to expand generates a sufficient frictional force with the wall of the rotatable body 100 that defines the relevant balancing plug hole 112a–f to retain the balancing plug 114 in a desired vertical position within the rotatable body 100. A single flange 126 could be disposed at an appropriate location between the first end 116a and the second end 116b (e.g., midway) to hold the balancing plug 114 in the desired vertical position within the rotatable body 100 (not shown). Other ways of retaining the balancing plug 114 in position with the rotatable body 100 could also be utilized.

Figure 6A:
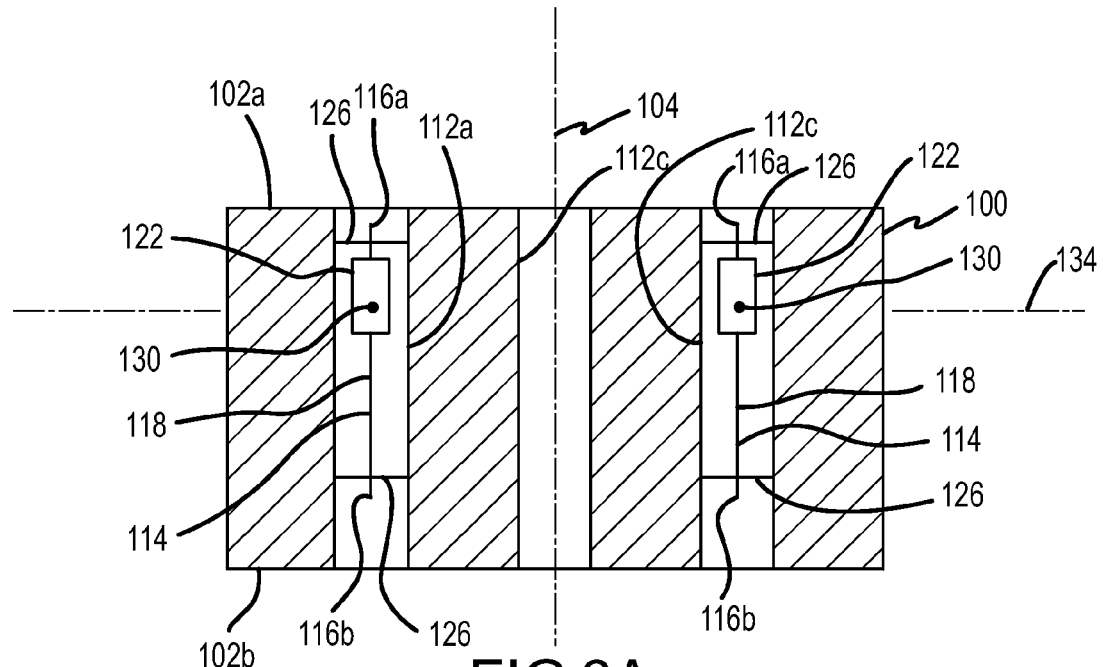
FIG. 6A is a cross-sectional view of the rotatable body of FIG. 5 along the line A—A and the common reference circle on which the plurality of balancing plug holes are disposed.

A balancing plug 114 may be disposed within any of the balancing plug holes 112a–f to address one or more rotational imbalances associated with the rotatable body 100. The general configuration of the balancing plug 114 in accordance with the foregoing (having a known, offset center of gravity 130) allows a particular balancing plug 114 to be used to balance in either of two different planes, simply by inverting the balancing plug 114 when installing the same in a particular balancing plug hole 112a–f. FIG. 5 illustrates an imbalance associated with an upper plane, and that is identified as "$I_U$." FIG. 6A illustrates that a balancing plug 114 has been positioned in the balancing plug hole 112a with its first end 116a above or at a higher elevation within the rotatable body 100 than its second end 116b. Similarly, a balancing plug 114 has been positioned in the balancing plug hole 112c with its first end 116a above or at a higher elevation within the rotatable body 100 than its second end 116b. The center of gravity 130 of the balancing plug 114 in the balancing plug hole 112a, along with the center of gravity 130 of the balancing plug 114 in the balancing plug hole 112c, are disposed within a common reference plane or first plane 134 that is perpendicular to the rotational axis 104 of the rotatable body 100 (or stated another way, that is parallel with each data storage disk mounted on the rotatable body 100). An installation tool may be used that positions each balancing plug 114 at the same vertical position or at a common elevation within the rotatable body 100 for providing a balancing force within the first plane 134 (e.g., by including a stop that engages an end 102a of the rotatable body 100 when the balancing plug 114 is at the desired position within the rotatable body 100).

Figure 6B:
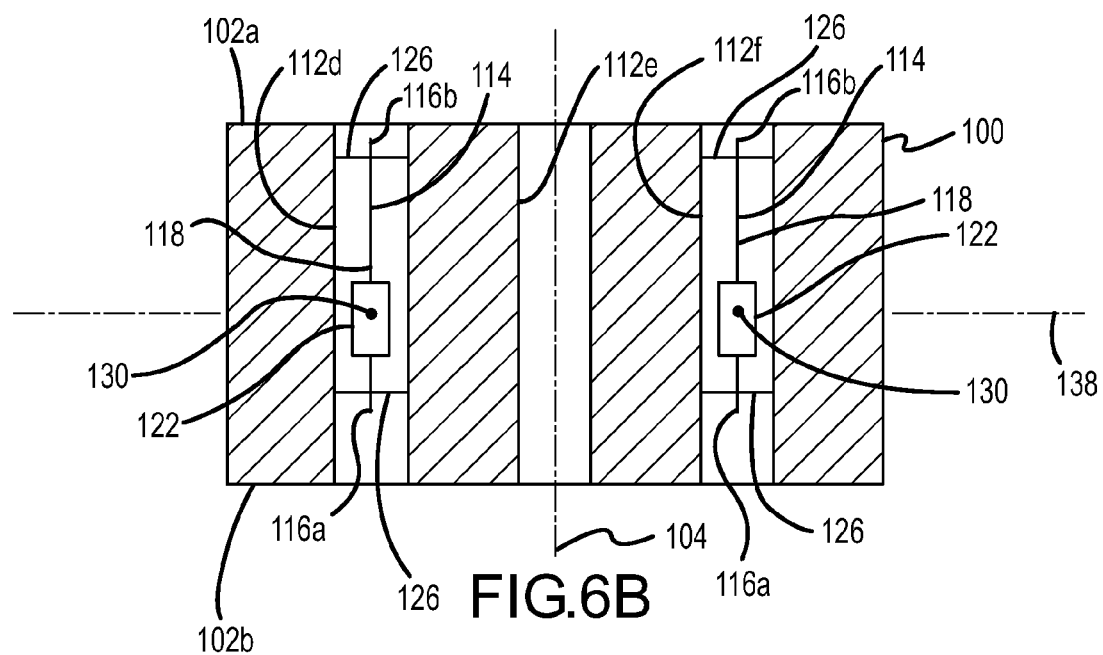
FIG. 6B is a cross-sectional view of the rotatable body of FIG. 5 along the line B—B and the common reference circle on which the plurality of balancing plug holes are disposed.

FIG. 5 also illustrates another imbalance that is associated with a lower plane, and that is identified as "$I_L$." FIG. 6B illustrates that a balancing plug 114 has been positioned in the balancing plug hole 112d with its second end 116b above or at a higher elevation within the rotatable body 100 than its first end 116a. Similarly, a balancing plug 114 has been positioned in the balancing plug hole 112f with its second end 116b above or at a higher elevation within the rotatable body 100 than its first end 116a. The center of gravity 130 of the balancing plug 114 in the balancing plug hole 112d, along with the center of gravity 130 of the balancing plug 114 in the balancing plug hole 112f, are disposed within a common reference plane or second plane 138 that is perpendicular to the rotational axis 104 of the rotatable body 100 (or again that is parallel with each data storage disk mounted on the rotatable body 100). An installation tool may be used that positions each balancing plug 114 at the same vertical position within the rotatable body 100 for balancing within the plane 138 (e.g., by including a stop that engages end 102a of the rotatable body 100 when the balancing plug 114 is at the desired position within the rotatable body 100). Preferably all balancing plugs 114 within the rotatable body 100 are disposed at a common elevation within the rotatable body 100 (although at least one plug 114 will have its first end 116a disposed "up", and at least one plug 114 will have its first end 116a disposed "down".

Based upon each balancing plug 114 that is available for balancing the rotatable body 100 preferably having a common length and a common offset center of gravity 130, the first plane 134 and the second plane 138 will be vertically spaced along the rotational axis 104 of the rotatable body 100 to provide dual plane balancing (i.e., balancing within two separate and distinct, vertically spaced, planes). This increases the potential of reducing an imbalance associated with a motor/disk assembly incorporating the rotatable body 100 to a desired degree for disk drive operations. The planes 134, 138 are separated by a distance of at least about 1 millimeter in one embodiment, are separated by a distance of at least about 2 millimeters in another embodiment, and are separated by a distance of about 4 millimeters in one embodiment.

The imbalances illustrated in FIG. 5, as well as how the same are addressed in FIGS. 6A–B, are of course but one example. There may be instances where only a single balancing plug 114 is needed in relation to the first plane 134 to address an imbalance. There may be instances where only a single balancing plug 114 is needed in relation to the second plane 138 to address an imbalance. There may be instances where balancing plugs 114 of different weights will be required in relation to the first plane 134 to address an imbalance. There also may be instances where balancing plugs 114 of different weights will be required in relation to the second plane 138 to address an imbalance. Any combination of these scenarios may exist as well. In each case, one or more balancing plugs 114 will be disposed so as to have their respective centers of gravity 130 located within the first plane 134, and one or more balancing plugs 114 will be disposed so as to have their respective centers of gravity 130 located within the second plane 138 to provide dual plane balancing simply by the ability to invert the position of the balancing plugs 114 within the rotatable body 100. Since the balancing plugs 114 are preferably the same length, the ends of each balancing plug 114 will also be disposed within vertically spaced reference planes as well, with the first plane 134 and the second plane 138 being disposed therebetween.

What is envisioned in relation to a motor/disk assembly that utilizes the rotatable body 100 is that a kit of a plurality of balancing plugs 114 will be available for attempting to balance those imbalances that one could reasonably anticipate encountering during disk drive operations. A predetermined number of configurations could be utilized for this kit of plugs 114, and multiple weights could be provided in relation to at least some of, and possibly all of, the configurations (e.g., by changing the density of all or a portion of the plug 114) to have a sufficient variety of weights for balancing in accordance with the foregoing. In any case, each such balancing plug 114 within this kit must have a center of gravity 130 that is offset in the direction of the first end 116a of the plug 114. Moreover, preferably each such balancing plug 114 also is of the same length (i.e., the same distance between its first end 116a and its second end 116b), and is configured such that the distance between the center of gravity 130 and the first end 116a is the same for each such balancing plug 114 in the kit. By having an offset center of gravity 130 and in a known location between its first end 116a and its second end 116b, a given balancing plug 114 may be used for balancing in either the first plane 134 or the second plane 138, simply depending upon the orientation of the plug 114 within the rotatable body 100.

There are a number of benefits associated with the dual plane balancing provided by using the above-noted invertible balancing plugs 114. One is that any balancing plug 114 may be used to provide balancing within either of two vertically spaced reference planes within a motor/disk assembly using the rotatable body 100, simply by inverting the position of the plug 114 within the rotatable body 100. Another is that access to only one side or end 102a of the rotatable body 100 is required for dual plane balancing in accordance with the foregoing. As such, dual plane balances may be undertaken in accordance with the foregoing at a time when the rotatable body 100 is part of a motor/disk assembly and installed in a disk drive such that its side or end 102b faces the base plate of the disk drive.

The various balancing plugs 114 that may be used to balance the rotatable body 100 have a known, offset center of gravity 130. Although it is preferred to have the center of gravity 130 for each such plug 114 be at the same location between the first end 116a and the second end 116b, such need not always be the case. Without a common offset center of gravity 130 at least among certain of the balancing plugs 114 available for balancing the rotatable body 100, balancing may be undertaken in two or more different planes. Consider the case where three balancing plugs 114 are used to balance the rotatable body 100, where each of these balancing plugs 114 has its center of gravity 130 offset toward its first end 116a, but where the distance between the center of gravity 130 and the first end 116a is different for each of the three balancing plugs 114. Two of the balancing plugs 114 could be disposed in the rotatable body 100 with their first end 116a "up," and the third balancing plug 114 could be disposed in the rotatable body 100 with its second end 116b "up" such that the three balancing plugs 114 would provide balancing in three vertically spaced reference planes relative to the rotational axis 104 of the rotatable body 100. Two of the balancing plugs 114 could be disposed in the rotatable body 100 with their second end 116b "up," and the third balancing plug 114 could be disposed in the rotatable body 100 with its first end 116a "up" such that the three balancing plugs 114 would provide balancing in three vertically spaced reference planes relative to the rotational axis 104 of the rotatable body 100. It should be appreciated that balancing could be achieved in a number of additional reference planes in this same general manner.

Figure 7:
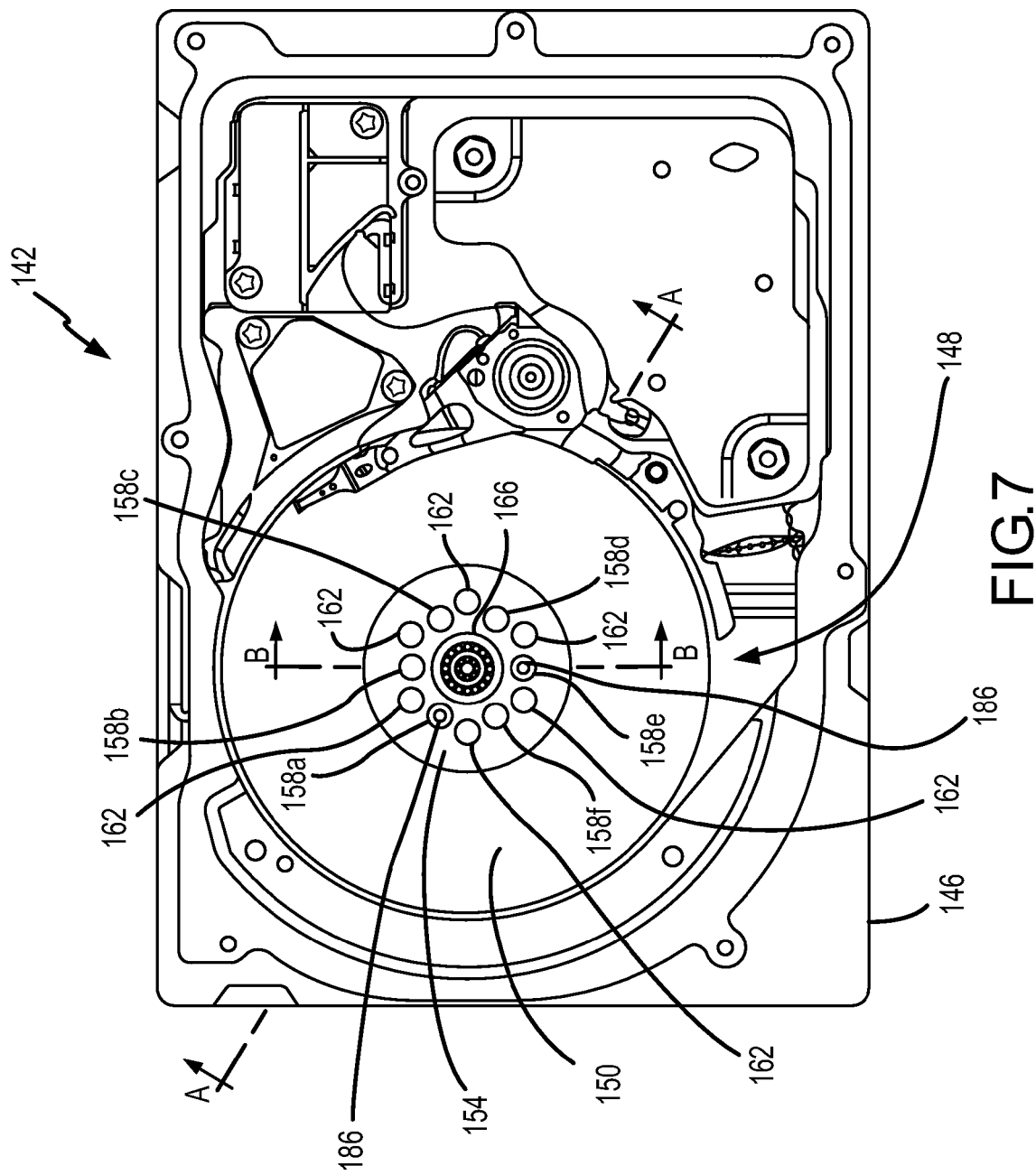
FIG. 7 is one embodiment of a disk drive having a motor/disk assembly that is configured for balancing in multiple, vertically spaced reference planes using invertible balancing plugs in accordance with the same principles used by the FIG. 5 embodiment.

FIGS. 7–8B illustrate one embodiment of the disk drive 142 that may utilizes a rotatable body at least generally of the type discussed above in relation to FIG. 5 for providing balancing in multiple planes using invertible balancing plugs. Only those portions of the disk drive 142 that are relevant to this type of multi-plane balancing will be addressed. The disk drive 142 includes a motor/disk assembly 148 that is mounted to a base plate 146. The motor/disk assembly 148 includes a single data storage disk 150. Multiple data storage disks 150 could be used by the motor/disk assembly 148 as well (not shown, but where each data storage disk 150 would be disposed in parallel and equally spaced, vertical relation).

The motor/disk assembly 148 includes a spindle motor 166, for rotating the data storage disk 150 at a desired speed. The spindle motor 166 includes a motor shaft 170 that is appropriately interconnected with the base plate 146 (e.g., stationary or rotatable). A motor hub 174 is disposed about and is able to rotate relative to the motor shaft 170. Any appropriate number and/or type of bearings may be disposed between the motor shaft 170 and the motor hub 174 to allow the motor hub 174 to rotate via one or more electromagnetic force components 182 of the spindle motor 166. The motor hub 174 includes a plurality of balancing plug holes 178 for receiving one or more invertible balancing plugs 186 to provide balancing in multiple planes in the same general manner discussed above in relation to the rotatable body 100 and balancing plugs 114 of FIGS. 5–6B.

The data storage disk 150 is mounted to the motor hub 174 by a disk clamp 154. The disk clamp 154 includes a plurality of disk clamp holes 162 through which an appropriate fastener may be directed through the clamp 154 and into the motor hub 174. The disk clamp holes 162 are located on a common bolt circle having a center that corresponds with the spindle motor shaft 170. Directing the disk clamp 154 in the direction of the motor hub 174 causes the disk clamp 154 to compress the disk 150 between a spacer 152 and a shoulder that is formed on the motor hub 174. The disk clamp 154 further includes a plurality of balancing plug holes 158a–f. The balancing plug holes 158a–f are also located on a common circle having a center that corresponds with the spindle motor shaft 170. Each balancing plug hole 158a–f through the disk clamp 154 is aligned with its own balancing plug hole 178 in the motor hub 174. Therefore, a balancing plug 186 may be directed through a particular balancing plug hole 158a–f in the disk clamp 154, and thereafter into the aligned balancing plug hole 178 in the motor hub 174. An appropriate tool may be used to seat each balancing plug 186 in the motor/disk assembly 148 at a common elevation in the same manner discussed above in relation to the FIG. 5 embodiment.

Every balancing plug hole 178 in the motor hub a 174 may be used for balancing within a reference plane that is perpendicular to the motor shaft 170 and that is determined by the center of gravity of a balancing plug 186 disposed therein. FIGS. 7 and 8A illustrate that a single balancing plug 186 is being used for providing a balancing force within one reference plane, (e.g., an upper plane balance) while FIGS. 7 and 8B illustrate that a single balancing plug 186 is being used for providing a balancing force within a different reference plane (e.g., a lower plane balance). Generally, the balancing plug 186 illustrated in FIG. 8B (lower plane) is inverted in relation to the balancing plug 186 illustrated in FIG. 8A (upper plane). This disposes the center of gravity of these two plugs 186 in vertically spaced relation within the motor/disk assembly 148 for providing dual plane balancing.

Each balancing plug that is used to balance the motor/disk assembly 148 of FIGS. 7–8B must have a center of gravity that is offset toward one of its two ends in order to allow the same to be used to balance in either of two vertically spaced reference planes simply by inverting its position within the motor/disk assembly 148. As in the case of the balancing plugs 114 discussed above, each balancing plug 186 used to balance the motor/disk assembly 148 is also preferably of the same length and the offset center of gravity is at the same position from plug 186-to-plug 186. What is envisioned in relation to the motor/disk assembly 148 is that a kit or collection of a plurality of balancing plugs will be available to at least attempt to balance all reasonably foreseeable imbalances that may be encountered during disk drive operations. A predetermined number of configurations will be utilized for this kit of balancing plugs, and multiple weights may be provided in relation to at least some of, and possibly all of, these configurations (e.g., by changing the density of all or a portion of the plug) to have sufficient variety of weights for multi-plane balancing in accordance with the foregoing. In any case, each such balancing plug within this kit again must have a center of gravity that is offset toward one of its two ends at a known location, and preferably each such balancing plug in the kit is of the same length and with their respective centers of gravity being disposed at the same location between their respective two ends. Representative balancing plugs for such a kit are illustrated in FIGS. 9A–C, 10A–B, 11A–C, and 12A–C. Any one or more of these invertible balancing plugs may be used to balance the motor/disk assembly 148, as well as other motor/disk assemblies.

FIGS. 9A–C illustrate the embodiment of the balancing plugs 186 that are installed in the motor/disk assembly 148 of FIGS. 7–8B to provide balancing in vertically spaced planes simply by inverting the position of two balancing plug 186. The balancing plug 186 of FIGS. 9A–C is an elongate structure having a length dimension that extends between a first end 190 and a second end 194, and that is identified as "L" in FIG. 9A. The balancing plug 186 includes a body 202 having an enlarged head 206 that is disposed closer to the first end 190 than to the second end 194 to offset its center of gravity more toward the first end 190 than toward the second end 194 (actually extending from the first end 190 toward, but not to, the second end 194). The center of gravity of the balancing plug 186 is disposed a distance $D_{CG}$ from the first end 190. The distance $D_{CG}$ is approximately ⅓ of the length "L" in the case of the balancing plug 186. The center of gravity of the balancing plug 186 could be located anywhere along the length of the balancing plug 186, but in any case is closer to the first end 190 and at a known location.

The head 206 includes a single balancing weight receptacle 210. A balancing weight 218 is disposed in the balancing weight receptacle 210. Retention features 214 may be incorporated into that portion of the head 206 that defines the balancing weight receptacle 210 in order to enhance the retention of the balancing weight 218 within the head 206. The balancing weight 218 may be press-fit within the balancing weight receptacle 210, or the head 206 may be molded about the balancing weight 218 (e.g., using an insert molding process). Any appropriate way of integrating the balancing weight 218 with the head 206 may be utilized. Having the body 202 and head 206 be of one-piece construction in the illustrated embodiment (e.g., injection molded nylon), and having a separate balancing weight 218 installed in the head 206, may provide greater flexibility in relation to achieving a desired weight for the balancing plug 186 (e.g., by material/density selection for the balancing weight 218), and yet still allow the balancing plug 186 to be part of a collection of balancing plugs that may be used to balance the motor/disk assembly 148 in either of two different planes simply by inverting the balancing plug 186 (by having a known offset center of gravity).

A group of four flexible flanges 198 are disposed at one location along the length of the balancing plug 186, while another group of four flexible flanges 198 are disposed at another location along the length of the balancing plug 186. Any number of flexible flanges 198 could be disposed at each of these two longitudinal positions, including having a single annular flexible flange at each longitudinally spaced position (not shown). Moreover, one or more flexible flanges 198 could be disposed at a single location between the first end 190 and the second end 194 (not shown). In any case, having at least one flexible flange 198 may be used to retain the balancing plug 186 in a desired vertical position within the hub 174. At least one flexible flange 198 is disposed on each side of the center of gravity of the balancing plug 186 in the illustrated embodiment, which may facilitate being able to invert the balancing plug 186 to change the plane in which the balancing plug 186 is balancing for one or more motor/disk assembly configurations. Having at least two longitudinally spaced flexible flanges 198 may also facilitate being able to invert the balancing plug 186 to change the plane in which the balancing plug 186 is balancing for one or more motor/disk assembly configurations. An outer effective diameter (collectively defined by the four flanges 198 in the illustrated embodiment) at each of the two longitudinal locations is larger than the diameter of the particular balancing plug hole 178 in which the balancing plug 186 is disposed. Therefore, the free end of each flange 198 deflects toward the body 202 (or a central longitudinal reference axis along which in the balancing plug 186 extends) when the balancing plug 186 is disposed in a particular balancing plug hole 178. The attempt of the flanges 198 to expand generates a sufficient frictional force with the wall of the hub 174 that defines the relevant balancing plug hole 178 to retain the balancing plug 186 in a desired vertical position within the hub 174.

Figure 10B:
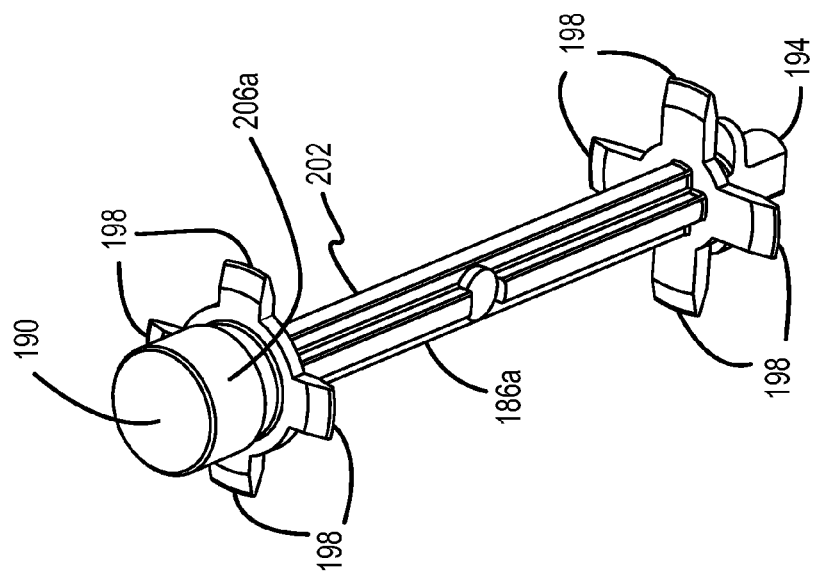
FIG. 10B is a perspective view of the balancing plug of FIG. 10A.
Figure 10A:
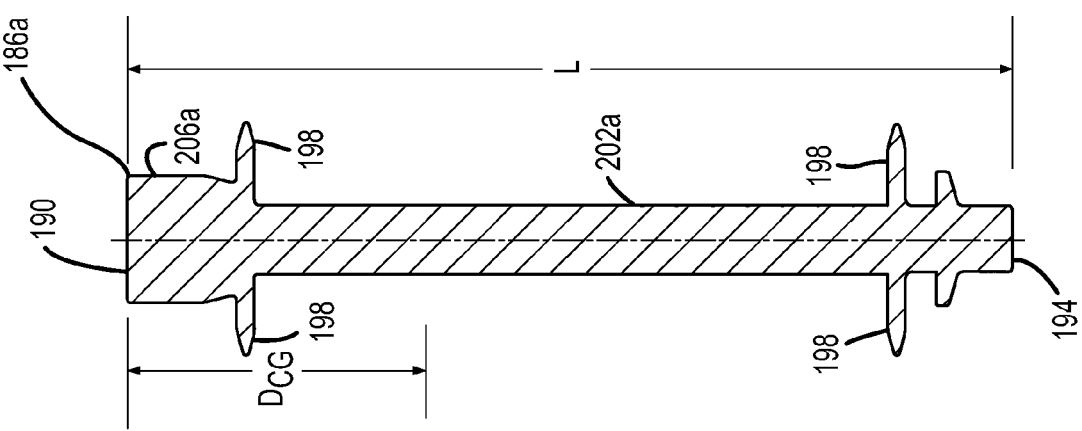
FIG. 10A is an enlarged cross-sectional view of another embodiment of an invertible balancing plug for balancing in either of two vertically spaced planes of a motor/disk assembly depending upon its orientation therein.

FIGS. 10A–B illustrate another embodiment of a balancing plug 186a that may be used to balance the motor/disk assembly 148 of FIGS. 7–8B in either of two vertically spaced planes, simply by inverting the position of the balancing plug 186a within the motor/disk assembly 148. Components of the balancing plug 186a that correspond with components of the balancing plug 186 of FIGS. 9A–C are identified by the same reference numeral. Corresponding components that differ in at least some respect include an "a" designation in the embodiment of FIGS. 10A–B.

The balancing plug 186a of FIGS. 10A–B is an elongate structure having a length dimension that extends between a first end 190 and a second end 194, and that is identified as "L" in FIG. 10A. The length "L" for the balancing plug 186a is preferably the same as the length "L" for the balancing plug 186 of FIGS. 9A–C. The balancing plug 186a includes a body 202a having an enlarged head 206a that is disposed closer to the first end 190 than to the second end 194 to offset its center of gravity more toward the first end 190 than toward the second end 194 (actually extending from the first end 190 toward, but not to, the second end 194). The center of gravity of the balancing plug 186a is disposed a distance $D_{CG}$ from the first end 190. The dimension "$D_{CG}$" for the balancing plug 186a is preferably the same magnitude as the dimension "$D_{CG}$" for the balancing plug 186 of FIGS. 9A–C, but in any case is offset toward the first end 190 at a known location so as to be able to provide dual plane balancing simply by inverting the position of the balancing plug 186a within the motor/disk assembly 148.

A group of four flexible flanges 198 are disposed at one location along the length of the balancing plug 186a, while another group of four flexible flanges 198 are disposed at another location along the length of the balancing plug 186a. Any number of flexible flanges 198 could be disposed at each of these two longitudinal positions, including a single annular flexible flange at each longitudinally spaced position (not shown). Moreover, one or more flexible flanges 198 could be disposed at a single location between the first end 190 and the second end 194 (not shown). In any case, having at least one flexible flange 198 may be used to retain the balancing plug 186a in a desired vertical position within the hub 174. At least one flexible flange 198 is disposed on each side of the center of gravity of the balancing plug 186a in the illustrated embodiment, which may facilitate being able to invert the balancing plug 186a to change the plane in which the balancing plug 186a is balancing for one or more motor/disk assembly configurations. Having at least two longitudinally spaced flexible flanges 198 may also facilitate being able to invert the balancing plug 186a to change the plane in which the balancing plug 186a is balancing for one or more motor/disk assembly configurations. An outer effective diameter (collectively defined by the four flanges 198 in the illustrated embodiment) at each of the two longitudinal locations is larger than the diameter of the particular balancing plug hole 178 in which the balancing plug 186*a* is disposed. Therefore, the free end of each flange 198 deflects toward the body 202*a* (or a central longitudinal reference axis along which in the balancing plug 186 extends) when the balancing plug 186*a* is disposed in a particular balancing plug hole 178. The attempt of the flanges 198 to expand generates a sufficient frictional force with the wall of the hub 174 that defines the relevant balancing plug hole 178 to retain the balancing plug 186*a* in a desired vertical position within the hub 174.

FIGS. 11A–C illustrate another embodiment of a balancing plug 186*b* that may be used to balance the motor/disk assembly 148 of FIGS. 7–8B in either of two vertically spaced planes, simply by inverting the position of the balancing plug 186*b* within the motor/disk assembly 148. Components of the balancing plug 186*b* that correspond with components of the balancing plug 186 of FIGS. 9A–C are identified by the same reference numeral. Corresponding components that differ in at least some respect include a "b" designation in the embodiment of FIGS. 11A–C.

The balancing plug 186*b* of FIGS. 11A–C is an elongate structure having a length dimension that extends between a first end 190 and a second end 194, and that is identified as "L" in FIG. 11A. The length "L" for the balancing plug 186*b* is preferably the same as the length "L" for the balancing plug 186 of FIGS. 9A–C. The balancing plug 186*b* includes a body 202*b* having an enlarged head 206*b* that is disposed closer to the first end 190 than to the second end 194 to offset its center of gravity more toward the first end 190 than toward the second end 194 (actually extending from the first end 190 toward, but not to, the second end 194). The center of gravity of the balancing plug 186*b* is disposed a distance $D_{CG}$ from the first end 190. The dimension "$D_{CG}$" for the balancing plug 186*b* is preferably the same magnitude as the dimension "$D_{CG}$" for the balancing plug 186 of FIGS. 9A–C, but in any case is offset toward the first end 190 at a known location.

The head 206*b* includes a two balancing weight receptacles 210*b*$_1$ and 210*b*$_2$. The balancing weight receptacles 210*b*$_1$ and 210*b*$_2$ face in the same direction, but are of a different size. A balancing weight 218*b*$_1$, 218*b*$_2$ is disposed in the corresponding balancing weight receptacle 210*b*$_1$, 210*b*$_2$. Retention features 214 may be incorporated into that portion of the head 206*b* that defines the balancing weight receptacles 210*b*$_1$, 210*b*$_2$ in order to enhance the retention of the balancing weights 218*b*$_1$, 218*b*$_2$ within the head 206*b*. The balancing weights 218*b*$_1$, 218*b*$_2$ may be press-fit within the corresponding balancing weight receptacle 210*b*$_1$, 210*b*$_2$, or the head 206*b* may be molded about the balancing weights 218*b*$_1$, 218*b*$_2$ (e.g., using an insert molding process). Any appropriate way of integrating the balancing weight 218*b*$_1$, 218*b*$_2$ with the head 206*b* may be utilized. Having the body 202*b* and head 206*b* be of one-piece construction in the illustrated embodiment (e.g., injection molded nylon), and having a pair of separate balancing weights 218*b*$_1$, 218*b*$_2$ of different sizes installed in the head 206*b*, may provide greater flexibility in relation to achieving a desired weight for the balancing plug 186*b* (e.g., by material/density selection for the balancing weights 218*b*$_1$, 218*b*$_2$), and yet still allow the balancing plug 186*b* to be part of a collection of balancing plugs that may be used to balance the motor/disk assembly 148 in either of two different planes simply by inverting the balancing plug 186*b* (by having a known offset center of gravity).

A group of four flexible flanges 198 are disposed at one location along the length of the balancing plug 186*b*, while another group of four flexible flanges 198 are disposed at another location along the length of the balancing plug 186*b*. Any number of flexible flanges 198 could be disposed at each of these two longitudinal positions, including a single annular flexible flange at each longitudinally spaced position (not shown). Moreover, one or more flexible flanges 198 could be disposed at a single location between the first end 190 and the second end 194 (not shown). In any case, having at least one flexible flange 198 may be used to retain the balancing plug 186*b* in a desired vertical position within the hub 174. At least one flexible flange 198 is disposed on each side of the center of gravity of the balancing plug 186*b* in the illustrated embodiment, which may facilitate being able to invert the balancing plug 186*b* to change the plane in which the balancing plug 186*b* is balancing. Having at least two longitudinally spaced flexible flanges 198 also may facilitate being able to invert the balancing plug 186*b* to change the plane in which the balancing plug 186*b* is balancing for one or more motor/disk assembly configurations. An outer effective diameter (collectively defined by the four flanges 198 in the illustrated embodiment) at each of the two longitudinal locations is larger than the diameter of the particular balancing plug hole 178 in which the balancing plug 186*b* is disposed. Therefore, the free end of each flange 198 deflects toward the body 202 (or a central longitudinal reference axis along which in the balancing plug 186*b* extends) when the balancing plug 186 is disposed in a particular balancing plug hole 178. The attempt of the flanges 198 to expand generates a sufficient frictional force with the wall of the hub 174 that defines the relevant balancing plug hole 178 to retain the balancing plug 186*b* in a desired vertical position within the hub 174.

Figures 12B, 12C:
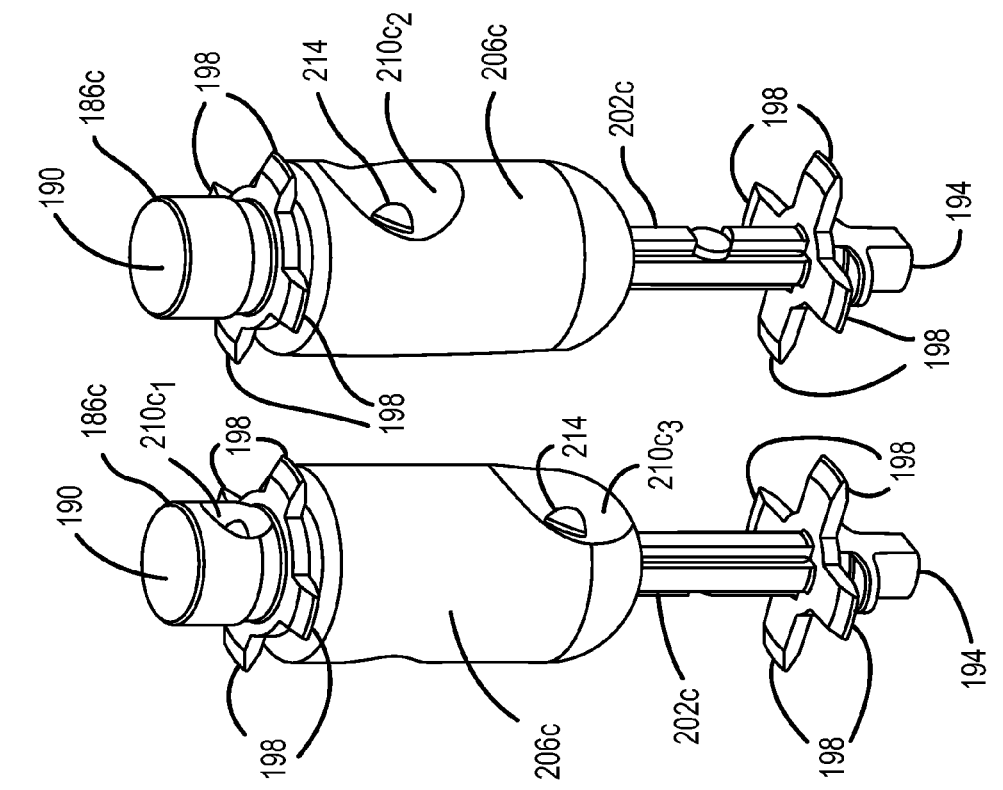
FIGS. 12B–C are perspective views of the balancing plug of FIG. 12A.
Figure 12A:
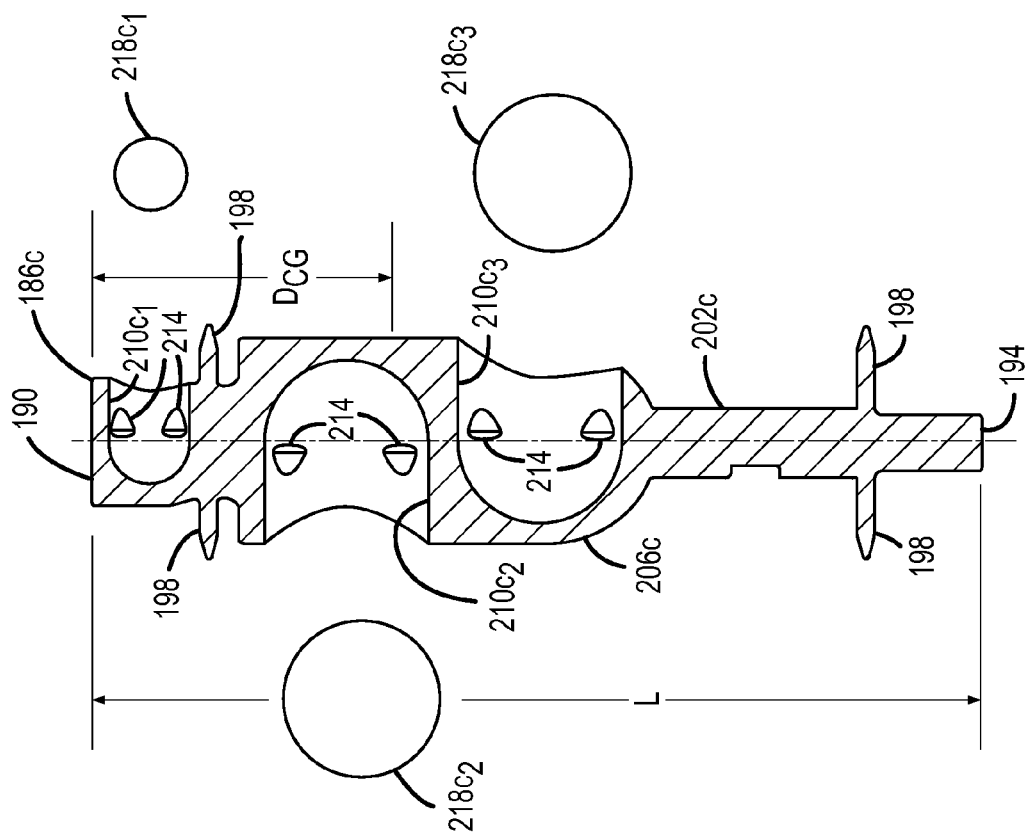
FIG. 12A is an enlarged cross-sectional view of another embodiment of an invertible balancing plug for balancing in either of two vertically spaced planes of a motor/disk assembly depending upon its orientation therein.

FIGS. 12A–C illustrate another embodiment of a balancing plug 186*c* that may be used to balance the motor/disk assembly 148 of FIGS. 7–8B in either of two vertically spaced planes, simply by inverting the position of the balancing plug 186*c* within the motor/disk assembly 148. Components of the balancing plug 186*b* that correspond with components of the balancing plug 186 of FIGS. 9A–C are identified by the same reference numeral. Corresponding components that differ in at least some respect include a "c" designation in the embodiment of FIGS. 12A–C.

The balancing plug 186*c* of FIGS. 12A–C is an elongate structure having a length dimension that extends between a first end 190 and a second end 194, and that is identified as "L" in FIG. 12A. The length "L" for the balancing plug 186*c* is preferably the same as the length "L" for the balancing plug 186 of FIGS. 9A–C. The balancing plug 186*c* includes a body 202*c* having an enlarged head 206*c* that is disposed closer to the first end 190 than to the second end 194 to offset its center of gravity more toward the first end 190 than toward the second end 194 (actually extending from the first end 190 toward, but not to, the second end 194). The center of gravity of the balancing plug 186*c* is disposed a distance $D_{CG}$ from the first end 190. The dimension "$D_{CG}$" for the balancing plug 186*c* is preferably the same magnitude as the dimension "$D_{CG}$" for the balancing plug 186 of FIGS. 9A–C, but in any case is known so as to be able to provide dual plane balancing simply by inverting the position of the balancing plug 186*c* within the motor/disk assembly 148.

The head 206*c* includes three balancing weight receptacles 210*c*$_1$, 210*c*$_2$, and 210*c*$_3$. The balancing weight receptacles 210*c*$_1$ and 210*c*$_3$ face in the same direction, but are of a different size. The balancing weight receptacle 210*c*$_2$ faces in the opposite direction of the balancing weight receptacles 210*c*$_1$ and 210*c*$_3$ and is of the same size as the balancing weight receptacle 210*c*$_3$. A balancing weight 218*c*$_1$, 218*c*$_2$ 218*c*$_3$ is disposed in the corresponding balancing weight receptacle $210c_1$, $210c_2$, and $210c_3$. Retention features 214 may be incorporated into that portion of the head 206c that defines the balancing weight receptacles $210c_1$, $210c_2$, and $210c_3$ in order to enhance the retention of the balancing weights $218c_1$, $218c_2$ $218c_3$ within the head 206c. The balancing weights $218c_1$, $218c_2$ $218c_3$ may be press-fit within the corresponding balancing weight receptacle $210c_1$, $210c_2$, and $210c_3$, or the head 206c may be molded about the balancing weights $218c_1$, $218c_2$ $218c_3$ (e.g., using an insert molding process). Any appropriate way of integrating the balancing weight $218c_1$, $218c_2$ $218c_3$ with the head 206c may be utilized. Having the body 202c and head 206c be of one-piece construction in the illustrated embodiment (e.g., injection molded nylon), and having multiple balancing weights $218c_1$, $218c_2$ $218c_3$, at least two of which are of different sizes, installed in the head 206c may provide greater flexibility in relation to achieving a desired weight for the balancing plug 186c (e.g., by material/density selection for the balancing weights $218c_1$, $218c_2$ $218c_3$), and yet still allow the balancing plug 186c to be part of a collection of balancing plugs that may be used to balance the motor/disk assembly 148 in either of two different planes simply by inverting the balancing plug 188c (by having a known offset center of gravity).

A group of four flexible flanges 198 are disposed at one location along the length of the balancing plug 186c, while another group of four flexible flanges 198 are disposed at another location along the length of the balancing plug 186c. Any number of flexible flanges 198 could be disposed at each of these two longitudinal positions, including a single annular flexible flange at each longitudinally spaced position. Moreover, one or more flexible flanges 198 could be disposed at a single location between the first end 190 and the second end 194 (not shown). In any case, having at least one flexible flange 198 may be used to retain the balancing plug 186c in a desired vertical position within the hub 174. At least one flexible flange 198 is disposed on each side of the center of gravity of the balancing plug 186c in the illustrated embodiment, which may facilitates being able to invert the balancing plug 186c to change the plane in which the balancing plug 186c is balancing for one or more motor/disk assembly configurations. Having at least two longitudinally spaced flexible flanges 198 may also facilitate being able to invert the balancing plug 186c to change the plane in which the balancing plug 186c is balancing for one or more motor/disk assembly configurations. An outer effective diameter (collectively defined by the four flanges 198 in the illustrated embodiment) at each of the two longitudinal locations is larger than the diameter of the particular balancing plug hole 178 in which the balancing plug 186c is disposed. Therefore, the free end of each flange 198 deflects toward the body 202c (or a central longitudinal reference axis along which in the balancing plug 186c extends) when the balancing plug 186c is disposed in a particular balancing plug hole 178. The attempt of the flanges 198 to expand generates a sufficient frictional force with the wall of the hub 174 that defines the relevant balancing plug hole 178 to retain the balancing plug 186c in a desired vertical position within the hub 174.

It should be appreciated that any configuration and weight of a balancing plug may be used to balance in different planes of a motor disk assembly simply by inverting the orientation of the same, so long as each balancing plug has a known offset of its center of gravity in the length dimension. That is, the configurations of the plugs 186, 186a, 186b and 186c is representative—not an exhaustive list of all possible configurations. With regard to balancing the motor/disk assembly 148 using at least two plugs selected from the configurations of the balancing plugs 186, 186a, 186b, 186c any single balancing plug 186, 186a, 186b, or 186c may be positioned with its first end 190 disposed at a higher elevation than its second end 194 when installed in the motor/disk assembly 148 of FIGS. 7–8B to provide balancing within an "upper" plane. Similarly, any single balancing plug 186, 186a, 186b, or 186c may be positioned with its second end 194 disposed at a higher elevation than its first end 190 when installed in the motor/disk assembly 148 of FIGS. 7–8B to provide balancing within a "lower" plane. Two or more balancing plugs 186, 186a, 186b, or 186c (of a single configuration or any combination of multiple configurations), may be positioned with their respective first end 190 disposed at a higher elevation than their respective second end 194 when installed in the motor/disk assembly 148, and with their center of gravity being within a common reference plane that is perpendicular to the motor shaft 170 about which the motor hub 174 and disk 150 rotate, to provide balancing within an "upper" plane. Similarly, two or more balancing plugs 186, 186a, 186b, or 186c (of a single configuration or any combination of multiple configurations), may be positioned with their respective second end 194 disposed at a higher elevation than their respective first end 190 when installed in the motor/disk assembly 148, and with their center of gravity being within a common reference plane that is perpendicular to the motor shaft 170 about which the motor hub 174 and disk 150 rotate, to provide balancing within a "lower" plane.

Balancing may also be provided in more than two planes using at least three invertible balancing plugs selected from a collection for the motor/disk assembly 148. One of these balancing plugs would have to have its center of gravity offset differently than at least one of the other two balancing plugs. All three balancing plugs could have their respective center of gravity offset at a different location. In any case, two of these plugs could be disposed in one orientation and the other plug could be disposed in the opposite orientation (inverted). Consider the case where one balancing plug 186 is disposed with its first end 190 "up" and where another balancing plug 186 having the same offset for its center of gravity is disposed with its second end 194 "up", and where a third balancing plug 186a has a different offset for its center of gravity. This third balancing plug 186a could be disposed in either position, and the three balancing plugs 186, 186, 186a would then provide balancing in three different reference planes. Preferably, all balancing plugs are disposed at a common elevation within the motor/disk assembly 148 (i.e. such that each end 190, 194 of each invertible balancing plug is disposed within one of two vertically spaced reference planes)t.

The motor/disk assembly 148 may be balanced in accordance with the foregoing after being installed on the base plate 146 of the drive 142, or may be balanced prior to being installed on the base plate 146. In any case, an appropriate cover (e.g., the same or similar to cover 12 of disk drive 10) would sometime thereafter be attached to the base plate 146 to dispose the motor/disk assembly 148 within an enclosed space. The only remaining "processing" of the motor/disk assembly 148 itself is the servo writing operation where a plurality of concentric tracks are formed on typically each data storage surface of each disk 150 of the motor/disk assembly 148.

Servo writing operations are undertaken after the various components of the disk drive 142 have been enclosed between the base plate 146 and its associated cover. A plurality of concentrically disposed tracks are typically formed on each data storage surface of each disk 150 of the motor/disk assembly 148. The basic principles of servo writing will be described in relation to the schematic presented in FIG. 13. Here a voice coil 324 is attached to a single actuator arm 320 that moves about an axis 318, a single suspension 316 is attached to this actuator arm 320, and a slider 322 is attached to the free end of the suspension 316.

Figure 13:
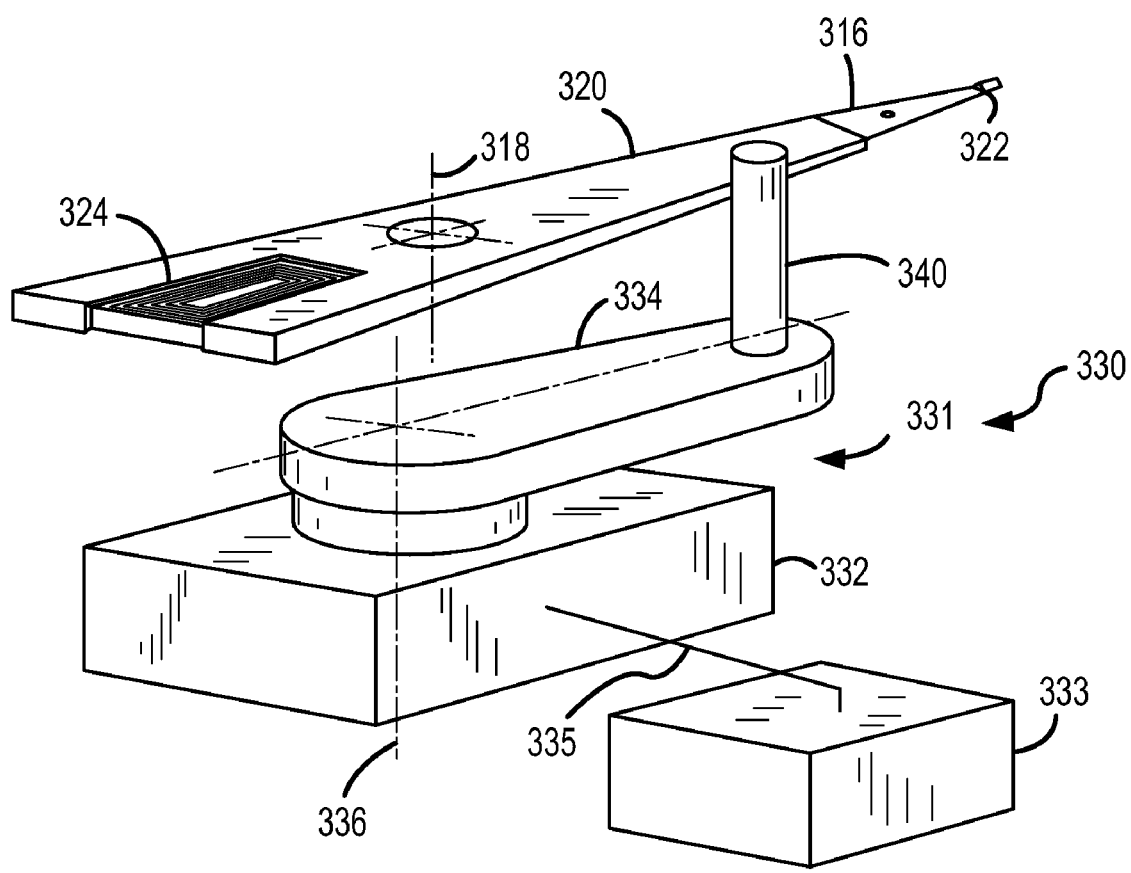
FIG. 13 is a schematic that illustrates the basic principles of servo writing.

FIG. 13 generally illustrates a servo writer 330 that includes a positioning system 331 having a platform 332 to which the components of the positioning system 331 are either directly or indirectly affixed, and a control unit 333 that is at least operatively connected to the platform 332 and functioning to control servo writing functions of the servo writer 330. A first end of a positioning arm 334 is connected to the platform 330 in a manner that allows the positioning arm 334 to move about a positioner axis 336. At a second end of the positioning arm 334, opposite the connection to platform 330, a push-pin assembly 340 is connected to the positioning arm 334. The positioning system 331 of the servo writer 330 is designed and configured such that at least a portion of the push-pin assembly 340 fits through a push-pin hole on the base plate of the disk drive. Additionally, the positioning system 331 is designed and configured such that movement of the positioning arm 334 about the positioner axis 336 will result in movement of the corresponding push-pin assembly 340 within the push-pin hole on the base plate.

Concentrically disposed annular data storage tracks are formed on the data storage disk associated with the slider 322. Generally, the push-pin assembly 340 from the positioning system 331 of the servo writer 330 is positioned to protrude through the push-pin hole on the base plate of the disk drive and into the noted enclosed space to typically interface with an appropriate surface of the actuator arm 320. The positioning system 331 moves the push-pin assembly 340 to position the actuator arm 320, to in turn dispose the slider 322 at the desired radial position of its corresponding data storage disk to form a track thereon. The voice coil motor of the disk drive may be used to provide a resistance force in a direction opposite that of the force exerted on the actuator arm 320 by the servo writer positioning arm 334 of the servo writer 330 via the push-pin assembly 340. Such a resistance force functions to maintain constant contact at the actuator arm interface, and enables the servo writer positioning system 331 to position the actuator arm 320 in a controlled and accurate manner. After each of the tracks has been created on the disk, the push-pin assembly 340 is withdrawn from the push-pin hole 18. The push-pin hole is then appropriately sealed.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A rotatable body, comprising:
first and second balancing plug holes;
a first balancing plug disposed in said first balancing plug hole, wherein said first balancing plug comprises first and second ends separated by a first distance, wherein a center of gravity of said first balancing plug is closer to said first end than said second end, and further is separated from said first end by a second distance, and wherein said first end of said first balancing plug is disposed above said second end of said first balancing plug when said first balancing plug is installed in said first balancing plug hole; and
a second balancing plug disposed in said second balancing plug hole, wherein said second balancing plug comprises third and fourth ends separated by a third distance, wherein a center of gravity of said second balancing plug is closer to said third end than said fourth end, and further is separated from said third end by a fourth distance, and wherein said fourth end of said second balancing plug is disposed above said third end of said second balancing plug when said second balancing plug is installed in said second balancing plug hole.

2. A rotatable body, as claimed in claim 1, wherein:
said first and second balancing holes are disposed on a common bolt circle having a center coinciding with a rotational axis of said rotatable body.

3. A rotatable body, as claimed in claim 1, wherein:
said first and second balancing holes are parallel with a rotational axis of said rotatable body.

4. A rotatable body, as claimed in claim 1, wherein:
said first and second balancing holes are accessible from a common side of said rotatable body.

5. A rotatable body, as claimed in claim 1, wherein:
said rotatable body comprises a plurality of balancing plug holes that are equally spaced about a rotational axis of said hub on a common bolt circle having a center that coincides with said rotational axis, wherein said plurality of balancing plug holes comprises said first and second balancing plug holes.

6. A rotatable body, as claimed in claim 1, wherein:
said first and second balancing plugs each comprise first and second longitudinally spaced flexible flanges.

7. A rotatable body, as claimed in claim 6, wherein:
said first and second flexible flanges of said first balancing plug each define a maximum diameter for said first balancing plug, and wherein said first and second flexible flanges of said second balancing plug each define a maximum diameter for said second balancing plug.

8. A rotatable body, as claimed in claim 1, wherein:
said center of gravity of said first balancing plug is disposed within a first reference plane that is perpendicular to a rotational axis of said rotatable body, wherein said center of gravity of said second balancing plug is disposed within a second reference plane that is perpendicular to said rotational axis, wherein said first and second reference planes are separated by a distance of at least about 1 millimeter measured along a line that is perpendicular to each of said first and second reference planes.

9. A rotatable body, as claimed in claim 1, wherein:
said center of gravity of said first balancing plug and said center of gravity of said second balancing plug are disposed at different elevations within said rotatable body that are separated by a distance of at least about 1 millimeter measured along an axis that is parallel to a rotational axis of said rotatable body.

10. A rotatable body, as claimed in claim 1, further comprising:

third and fourth balancing plug holes; and a third balancing plug disposed in said third balancing plug hole, wherein said third balancing plug comprises fifth and sixth ends separated by a fifth distance, wherein a center of gravity of said third balancing plug is closer to said fifth end than said sixth end, and further is separated from said fifth end by a sixth distance, and wherein said fifth end of said third balancing plug is disposed above said sixth end of said third balancing plug; and a fourth balancing plug disposed in said fourth balancing plug hole, wherein said fourth balancing plug comprises seventh and eighth ends separated by a seventh distance, wherein a center of gravity of said fourth balancing plug is closer to said seventh end than said eighth end, and further is separated from said eighth end by an eighth distance, wherein said eighth end of said fourth balancing plug is disposed above said seventh end of said fourth balancing plug.

11. A rotatable body, as claimed in claim 10, wherein:

said center of gravity of said first balancing plug and said center of gravity of said third balancing plug are disposed within a first reference plane that is perpendicular to a rotational axis of said rotatable body, and a wherein said center of gravity of said second balancing plug and said center of gravity of said fourth balancing plug are disposed within a second reference plane that is perpendicular to said rotational axis of said rotatable body, wherein said first and second reference planes are parallel and spaced from each other.

12. A rotatable body, as claimed in claim 11, wherein:

said first and second reference planes are spaced by a distance of at least about 1 millimeter.

13. A rotatable body, as claimed in claim 10, wherein:

said first and third distances are equal, wherein said second and fourth distances are equal, wherein said fifth and seventh distances are equal to each of said first and third distances, and wherein said sixth and eighth distances are equal to each of said second and fourth distances.

14. A rotatable body, as claimed in claim 1, wherein:

said first and third distances are equal, and wherein said second and fourth distances are equal.

* * * * *